United States Patent
Sogabe et al.

(10) Patent No.: US 12,441,030 B2
(45) Date of Patent: Oct. 14, 2025

(54) RESIN MOLDING DIE, METHOD FOR MANUFACTURING RESIN MOLDING DIE, METHOD FOR MANUFACTURING RESIN MOLDED ARTICLE, AND SYSTEM FOR MANUFACTURING RESIN MOLDED ARTICLE

(71) Applicants: TANAZAWA HAKKOSHA CO., LTD., Higashiosaka (JP); Eschmann Textures International GmbH, Gummersbach (DE)

(72) Inventors: Mitsushi Sogabe, Higashiosaka (JP); Melanie Eurich, Heilbronn (DE); Frederik Eurich, Bad Friedrichshal (DE)

(73) Assignees: TANAZAWA HAKKOSHA CO., LTD., Higashiosaka (JP); ESCHMANN TEXTURES INTERNATIONAL GMBH, Gummersbach (DE)

( * ) Notice: Subject to any disclaimer, the term of this patent is extended or adjusted under 35 U.S.C. 154(b) by 367 days.

(21) Appl. No.: 17/787,669

(22) PCT Filed: Dec. 20, 2019

(86) PCT No.: PCT/JP2019/050213
§ 371 (c)(1),
(2) Date: Jun. 21, 2022

(87) PCT Pub. No.: WO2021/124581
PCT Pub. Date: Jun. 24, 2021

(65) Prior Publication Data
US 2022/0410437 A1    Dec. 29, 2022

(51) Int. Cl.
*B29C 33/38* (2006.01)
*B29C 33/42* (2006.01)
(Continued)

(52) U.S. Cl.
CPC .......... *B29C 33/38* (2013.01); *B29C 33/3807* (2013.01); *B29C 33/3857* (2013.01);
(Continued)

(58) Field of Classification Search
CPC . B29C 33/38; B29C 33/3807; B29C 33/3857; B29C 33/42; B29C 33/56;
(Continued)

(56) References Cited

U.S. PATENT DOCUMENTS

| | | | | |
|---|---|---|---|---|
| 4,919,388 A * | 4/1990 | Koike | .................... | B29C 33/424 425/DIG. 30 |
| 2010/0075149 A1* | 3/2010 | Yoneshima | ......... | B29C 33/3814 428/409 |

(Continued)

FOREIGN PATENT DOCUMENTS

| | | | |
|---|---|---|---|
| JP | 2001-062842 A | | 3/2001 |
| JP | 2005-018532 A | | 1/2005 |

(Continued)

*Primary Examiner* — Jerzi H Moreno Hernandez
(74) *Attorney, Agent, or Firm* — Rabin & Berdo, P.C.

(57) ABSTRACT

To provide a resin molded product having a desired surface shape, a resin molding mold which can manufacture the resin molded product and a method of manufacturing the same, and a resin molding mold manufacturing system to achieve manufacturing of the resin molding mold, a resin molding mold according to the present invention includes a molding mold main body and a resin layer exposedly formed on a mold surface side of the molding mold main body, made of a heat-resistant complex material containing a synthetic resin, and a ceramic powder particle, and having a thickness of 50 to 800 μm. The resin molding mold according to the present invention includes the molding mold main body and the resin layer exposedly formed on the mold surface side of the molding mold main body and made of the heat-resistant composite materials including a synthetic resin, and the (Continued)

ceramic powder particle, and recesses and projections are formed on the resin layer by excavating a portion of the resin layer.

15 Claims, 14 Drawing Sheets

(51) Int. Cl.
    *B29C 33/56* (2006.01)
    *B29C 37/00* (2006.01)
    *B29C 59/02* (2006.01)

(52) U.S. Cl.
    CPC ............. *B29C 33/42* (2013.01); *B29C 33/56* (2013.01); *B29C 37/0053* (2013.01); *B29C 59/022* (2013.01); *B29C 2791/009* (2013.01)

(58) Field of Classification Search
    CPC ............. B29C 37/0053; B29C 59/022; B29C 2791/009; B29C 33/0053
    See application file for complete search history.

(56) References Cited

U.S. PATENT DOCUMENTS

2013/0141792 A1   6/2013  Ueda et al.
2017/0197336 A1*  7/2017  Sakai ................ B29C 33/3807

FOREIGN PATENT DOCUMENTS

| JP | 2007-160637 A | 6/2007 |
| JP | 2016-112609 A | 6/2016 |
| JP | 2017-007114 A | 1/2017 |
| WO | 2008/065946 A1 | 6/2008 |
| WO | 2012/117881 A1 | 9/2012 |
| WO | 2016/059937 A1 | 4/2016 |

* cited by examiner

①...leather pattern (large)
②...geometric pattern (diamond)
③...leather pattern (fine)
④...geometric pattern (circle)
⑤...pear skin texture (medium)

RESIN MOLDING DIE, METHOD FOR MANUFACTURING RESIN MOLDING DIE, METHOD FOR MANUFACTURING RESIN MOLDED ARTICLE, AND SYSTEM FOR MANUFACTURING RESIN MOLDED ARTICLE

TECHNICAL FIELD

The present invention relates to a resin molding mold and, furthermore, to a method for a resin molding mold, a method for manufacturing a resin molded product, and a system for manufacturing a resin molded product. In particular, the present invention relates to a resin molding mold for performing resin molding and a method of manufacturing the same, a method of manufacturing a resin molded product, and a resin molded product processing system which are used when a resin molded product having a surface having, for example, an embossed pattern (leather texture, skin texture, wood texture, pear skin texture, vein texture, scale texture, marble texture, hairlines, geometric patterns, mirror finish, finish coating, and the like) conditioning a molding surface to improve a product design is manufactured.

BACKGROUND ART

Conventionally, a gloss reduction process is performed by roughening the molding surface of a mold by pear skin texture by an etching process or a sandblast process. In addition, even though the gloss reduction process is unsatisfied, a molded product is also painted to conceal a defective appearance conventionally (for example, see Patent Literature 1).

PATENT LITERATURE

Patent Literature 1: Japanese Published Unexamined Application No. 2007-160637

SUMMARY OF THE INVENTION

Problem to be Solved by the Invention

In general, a synthetic resin molded product is desired to be high-finished and to have a blind defective appearance, and a molded product which achieves that and to which embossed patterns (leather texture, skin texture, wood texture, pear skin texture, vein texture, scale texture, marble texture, hairlines, geometric patterns, mirror finish, finish coating, and the like) are applied is desired. In addition, as a synthetic resin molded product for automobile interior, in particular, an instrument panel around a window or the like, a synthetic resin molded product which can prevent background reflection by embossing patters is desired. Thus, it is an object of the invention to provide a molding mold which can mold a molded product subjected to embossing patters, a method of manufacturing the same, and a resin molded product manufactured by the method.

It is another object of the invention to provide a resin molding system which can easily perform surface processing for forming different patterns on the surface of the same resin molded product.

Means for Solving the Problems

A resin-molding mold according to the present invention includes a molding mold main body and a resin layer having a thickness of 50 to 800 μm, which is exposedly formed on a mold surface side of the molding mold main body; and made of a heat-resistant complex material containing a synthetic resin and a ceramic powder particle.

In such a resin molding mold, gas generated in a resin molding state is effectively adsorbed by the ceramic powder particle exposed on the mold surface side. In this manner, the quality of a resin product can be effectively suppressed from being nonuniformed. In addition, since the thickness of the resin material is set to 50 to 800 μm, surface processing is performed to a required position of the resin layer to make it possible to give a desired surface shape to a resin molded product. As a result, a resin molding mold which can manufacture a resin molded product having a desired surface shape can be provided.

The resin molding mold according to the present invention includes a molding mold main body; and a resin layer being formed and exposed on a mold surface side of the molding mold main body, the resin layer comprising heat resistant composite materials including a synthetic resin and a ceramic powder particle; wherein recesses and projections are formed on the resin layer by excavating a portion of the resin layer.

In this case, the "excavating" ("dig") is a concept including various processes such as cutting, carving, or marking achieved by adjusting an output magnitude of a laser processing machine LP.

As such a resin molding mold, a resin molding mold having a surface to which a unique texture such as an emboss is given can be provided. As a result, a resin molding mold which can stably manufacture a resin product having a desired surface shape can be provided.

In order to achieve a change in the recesses and projections by replacing resin layers without changing mold main bodies, the recesses and projections are formed on the resin layer only.

In addition, in order to achieve surface shapes having plenty of variations, the recess of the recesses and projections includes desirably a mold surface recess exposed a bottom surface of the molding mold main body and a resin recess, whose bottom is formed on the resin layer.

The resin layer has a plurality of layers that is different ratios of the synthetic resin and the ceramic powder particle, and an end surface of the resin layers is exposed where the recesses and projections are formed. In this case, the characteristics of the layers are made different from each other to make it possible to mold a resin molded product having higher quality.

As a configuration to further exert the characteristics of the layers, a configuration in which recesses portions forming the recesses and projections are formed to have bottom surfaces in the different layers by making digging depths different from each other.

In order to secure a desired strength for the plurality of resin layers, any one of the resin layers further includes inorganic fibers, a fiber length is desirably 0.05 to 200 μm, and a fiber diameter is desirably 0.05 to 80 μm. The fiber length is more preferably 0.4 to 20 μm, and the fiber diameter is more preferably 5 to 80 μm.

Furthermore, as a concrete configuration to give different characteristics to the plurality of resin layers, the plurality of resin layers are laminated on the molding mold main body, a ratio of the inorganic fiber gradually becomes small.

In particular, in order to configure the plurality of resin layers to improve the quality of a resin molded product, the plurality of resin layers are laminated on the mold surface of the molding mold main body, in order that a ratio of the inorganic fiber gradually becomes small, and a resin layer which is farthest from the mold surface is preferably a mirror surface coating material layer, not including the inorganic fiber.

Furthermore, in order to obtain the surface of a resin product having a desired shape and a desired texture, a coating layer may be provided on a surface of the resin layer. As a matter of course, the coating layer may be formed on a configuration including a plurality of resin layers. As an object in this case, in addition to a layer improved in adhesion to the mold main body, when a layer to improve laser processability is formed, the recesses and projections which is more faithful to a sample can be processed. An object of the surface coating layer is gloss adjustment for a product. When these objects are combined to each other, surface shapes which are excellent in design can be obtained.

As a concrete example of the coating layer, a matte layer, a mirror surface coating layer, or a gloss adjustment layer can be given.

As a preferable mode to adsorb gas generated in molding, a resin layer is desirably configured to contain 45 to 65% ceramic powder particles. The ratios of ceramic powder particle are desirably 50 to 60% and especially desirably 52 to 57%.

In addition, the ceramic powder particle preferably has grain diameters of 0.1 to 70 µm in consideration of adsorption of gas generated in molding and preferable texture of a degree of matte of the molded product surface. Furthermore, in user of the ceramic powder particle, unnecessary gas generated in a molding state of a resin molded product can be adsorbed, or the texture of the surface can be improved. The ceramic powder particle functions as a so-called aggregate and also contributes to improvements in pressure resistance in molding and in abrasion resistance.

A method for manufacturing a resin molding mold, the method comprising; a resin layer forming step of forming, on a mold surface of a mold main body, a resin layer comprising heat-resistant composite materials including a synthetic resin, a ceramic powder particle and a diluent solvent; a temporarily curing step of temporarily curing resin materials by heating for a given time and maintaining a fixed temperature after the resin layer forming step; a main curing step of curing the resin materials by a heat treatment of the resin materials; and a recesses and projections forming step of forming recesses and projections of a prescribed shape on the resin layer formed in the resin layer forming step.

In use of the manufacturing method, provision of a resin molding mold having a surface to which a unique texture such as emboss is given is achieved. As a result, a method of manufacturing a resin molding mold which can stably manufacture a resin product having a desired surface shape can be provided. Note that a temperature in the pre-curing step is preferably set to 80° C.

Although the diluent solvent used in the resin layer is evaporated in manufacturing, ethyl cellosolve monoacetate the evaporating rate of which is known to be lower than that of another ordinary solvent is desirably used. This is because, when the evaporating rate of the solvent is low, material viscosity is hard to increase, a working time in actual working is flexibly set to improve the processability.

In order to reliably achieve a more accurate surface shape and a preferable surface texture, the recesses and projections forming step is desirably performed by irradiation of a laser beam.

When, as the laser light, the laser light is radiated by any of a carbon dioxide gas laser processing machine, a fiber laser processing machine, a femtosecond laser processing machine, a blue laser processing machine, a green laser processing machine, and a multi-wavelength composite laser processing machine which can coaxially irradiate at least two wavelengths emitted from laser oscillators is used, the above advantages can be preferably obtained.

In order to preferably manufacture a resin molding mold having a plurality of resin layers, the resin layer forming step and the pre-curing step are preferably performed to each of the plurality of resin layers.

In order to stably manufacture a resin molding mold which can manufacture a molded product having a surface shape desired for a consumer, the recesses and projections formed in the recesses and projections forming step are based on data scanned a recesses and projections sample with a scanner beforehand.

A system for manufacturing a resin molding mold by providing a mold surface of a mold material with recesses and projections to manufacture a resin molded product, including; mold material comprising a molding mold main body; and a resin layer formed and exposed on a mold surface side of the molding mold main body, the resin layer comprising heat-resistant composite materials including a synthetic resin, a ceramic powder particle and a diluent solvent, and having a thickness between 50 µm and 800 µm; a scanner; and a laser processing machine, wherein the system further comprises; a scanning step of scanning, with the scanner, a surface shape of recesses and projections samples; and a laser processing step of controlling the laser processing machine according to data scanned in the scanning step and processing a surface of the mold material.

A method of manufacturing a resin product according to the present invention is a method of manufacturing a resin molded product including a resin filling step of filling fluid resin for molding into the any one of the resin molding molds, a molding resin curing step of curing the molding resin after the resin filling step and a removing step of removing the molding resin which is cured from the resin molding mold.

Effect of the Invention

According to a resin molding mold according to the present invention, a method of manufacturing the same, and a resin molding mold manufacturing system according to the present invention, a resin molding mold which can manufacture a resin molded product having a desired surface shape can be provided. In addition, according to a method of manufacturing a resin molded product, a resin molded product having high quality can be provided.

The above object of the invention, other objects, characteristics, and advantages will further become clear by a description of a mode for carrying out the invention with reference to the accompanying drawings.

MODES FOR CARRYING OUT THE INVENTION

A resin molding mold 1, a method of manufacturing the same, and a resin molding mold manufacturing system S will be described below as an example of the invention in the embodiment.

Figure 1:
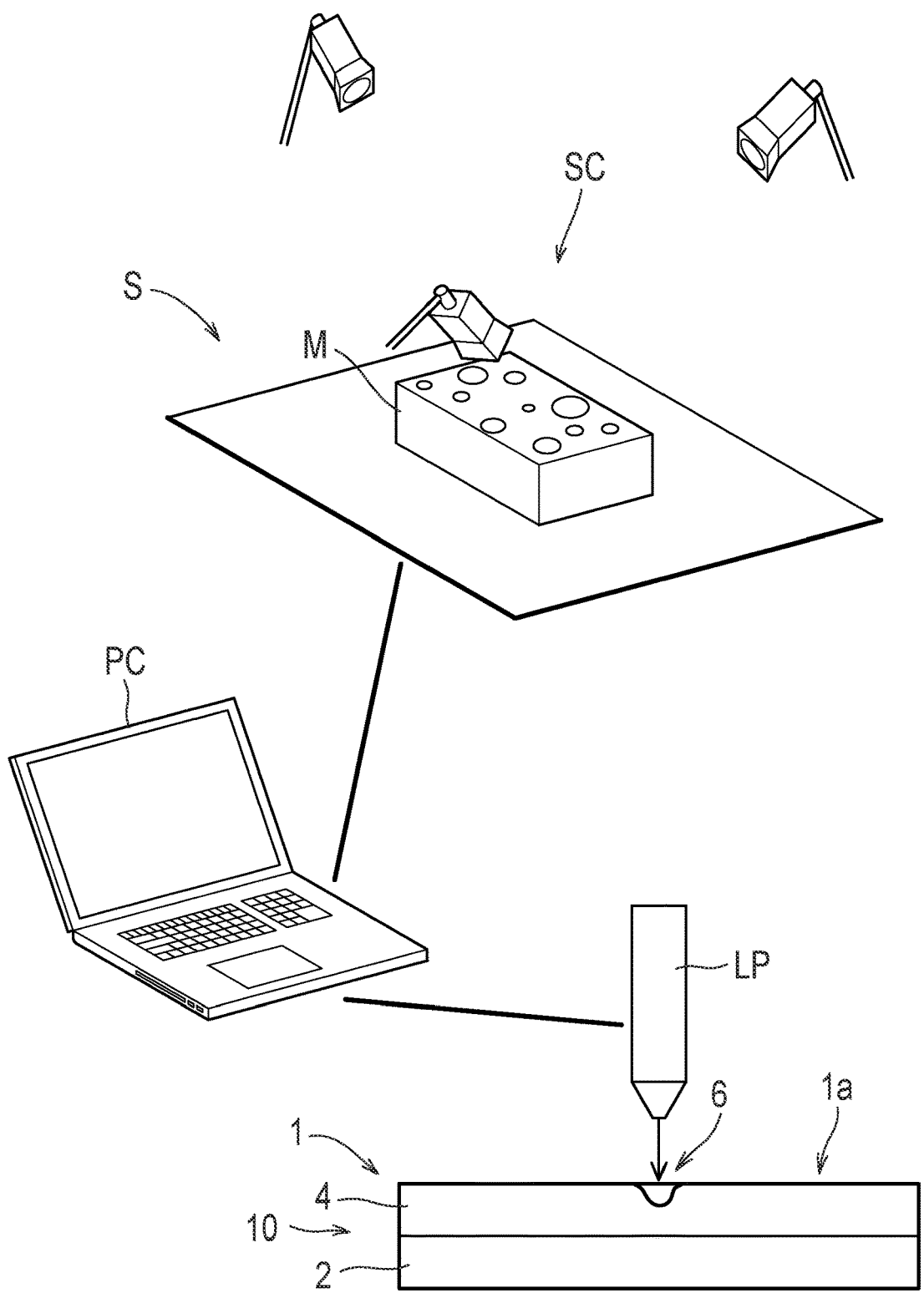
FIG. 1 is a diagram for explaining outlines of a resin molding mold according to an embodiment of the present invention, a method of manufacturing the same, and a resin molding mold manufacturing system.
Figure 2:
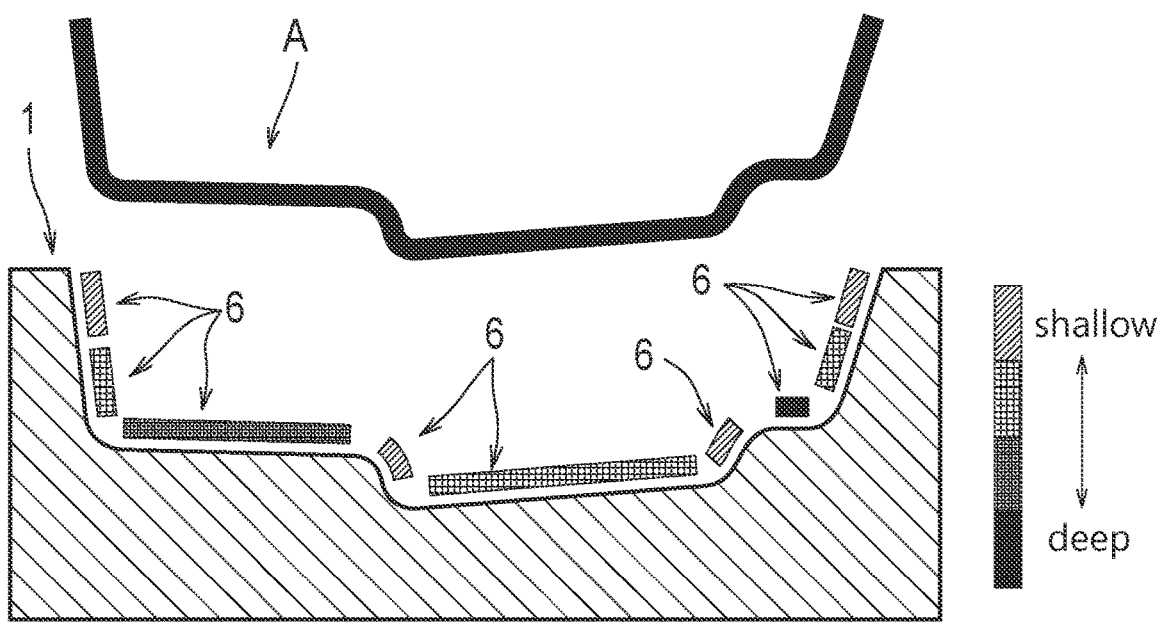
FIG. 2 is a diagram for explaining a structure of the resin molding mold according to the embodiment of the present invention.

The resin molding mold 1 according to the embodiment is manufactured by the resin molding mold manufacturing system shown in FIG. 1. The resin molding mold manufacturing system S, as shown in FIG. 1, includes a three-dimensional scanner SC (to also be referred to as a 3D scanner) scanning an uneven sample to make data, a personal computer PC storing three-dimensional data obtained from the three-dimensional scanner SC and performing appropriate processing, and a laser processing machine LP controlled by the personal computer PC.

More specifically, the resin molding mold manufacturing system S according to the resin molding mold manufacturing system S is to manufacture the resin molding mold 1 by giving a recesses and projections 6 to a mold surface 22 of a mold raw material 10 to manufacture a resin molded product, includes a mold raw material including a mold main body 2 and a resin layer 4 exposedly formed on the mold surface 22 side of the mold main body 2 and made of a heat-resistant complex material containing a synthetic resin 4a and a ceramic powder particle 4b, the three-dimensional scanner SC serving as a scanner, and the laser processing machine LP, and includes a scanning step of scanning a surface shape of an uneven sample M with the three-dimensional scanner SC and a laser processing step of controlling the laser processing machine LP depending on data obtained by scanning in the scanning step and processing the surface of the mold raw material 10. The laser processing step corresponds to a recesses and projections forming step in a method of manufacturing the resin molding mold 1 according to the embodiment.

The recesses and projections forming step which gives the recesses and projections 6 to the mold raw material 10, as shown in FIG. 1, is performed by using the laser processing machine LP. The laser processing machine LP is connected to the personal computer PC to give the predetermined recesses and projections 6 to the surface of the mold raw material 10 on the basis of the data. The recesses and projections 6 formed in the recesses and projections forming step is based on data obtained by scanning the uneven sample M with the three-dimensional scanner SC serving as a scanner in advance. As a matter of course, in addition to the data obtained by scanning, data stored in the personal computer PC in advance can also be used.

As a laser beam used in the laser processing step, i.e., the recesses and projections forming step, a laser beam emitted from any one of a carbon dioxide gas laser processing machine, a fiber laser processing machine, a femtosecond laser processing machine, a blue laser processing machine, a green laser processing machine, and a multi-wavelength composite laser processing machine which can coaxially irradiate at least two wavelengths emitted from laser oscillators can be given. The resin molding mold manufacturing system S according to the embodiment using the laser processing machine LP can effectively shorten a processing time. In addition, the resin molding mold manufacturing system S can easily form a pattern (emboss pattern) of the recesses and projections 6 in an any pattern depth of the recesses and projections 6 suitable for a draft angle of the mold. In the resin molding mold manufacturing system according to the embodiment, by the uneven pattern formed in the resin molding mold, the laser processing machines are changed to select an available laser beam (processing machine) depending on an uneven pattern to be formed in the resin molding mold 1. For example, when the carbon dioxide gas laser processing machine is used, a "pattern having about x mm.", and when the fiber laser processing machine is used, a "pattern having about x mm.". In this manner, depending on a characteristic of each of the laser processing machine and a shape desired to be formed in a resin molded product A, various laser processing machines can be selected appropriately. Note that, when a laser beam having a short or ultrashort pulse flickering at short intervals is irradiated, heat affection rarely occurs. Therefore, a finer uneven pattern tends to be able to be formed. In particular, when a fiber laser processing machine using an optical fiber having energy conversion efficiency as an amplification medium is used, the device itself can be reduced in size, and the device can be easily applied to a large molding mold.

The uneven sample M is a so-called sample having the recesses and projections 6 desired to be given to the surface of a resin molded product. In the embodiment, the surface of the uneven sample M is scanned by a method or the like in which, for example, image data from a plurality of directions to specify a three-dimensional shape of the surface. Data related to the scanned uneven sample M is transferred to the personal computer PC connected to the three-dimensional scanner SC. In this case, a destination to which the three-dimensional scanner SC transfers the data is not limited to the personal computer PC, a server computer or the like installed at a different position on the network may be used. Various existing methods may be conceived.

In the embodiment, as an example, a mode in which data obtained by scanning the uneven sample M is processed by the personal computer PC in which specific software is installed will be described.

Figure 3:
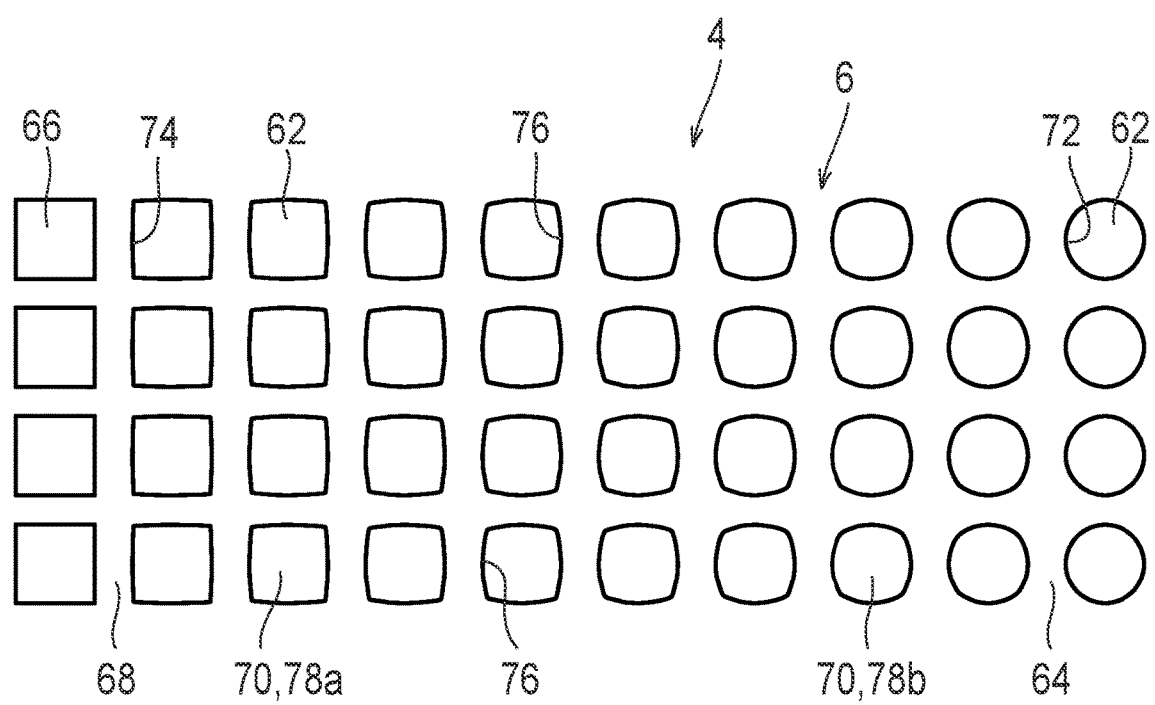
FIG. 3 is a diagram for explaining a surface shape of the resin molding mold according to the embodiment of the present invention.

The personal computer PC can appropriately process the data received from the three-dimensional scanner SC. More specifically, the personal computer PC, by using image editing software, can connect patterns of the different types of installed recesses and projections 6 to each other apparently naturally as shown in FIG. 3. In FIG. 3, the data related to the recesses and projections 6 exhibits a function of creating a recess portion having a shape successively changed from, for example, a circular shape to a rectangular shape while a change in shape between adjacent recess portions is reduced. In this manner, since pattern forming data of the recesses and projections 6 by using the pattern image editing software of the any recesses and projections 6 of different types is created and edited, partial change or the like can be easily performed. In the embodiment, by using the function, even if the surface area of the uneven sample M is small, the patterns are inconspicuously made continuous such that seams are not seen, and data processing can be performed such that the surface shape of the uneven sample M is reproduced in a large area. In addition, by using the image editing software, construction which requires long time for manually creating the construction can be easily performed. As a result, the resin molding mold manufacturing system S which can manufacture a resin molded product A having an unrestricted surface design is achieved.

Even though surface shapes obtained by the uneven samples M having surface shapes fully different for regions of the resin molded product A are reproduced, surface data in which patterns look as if been seamlessly continuous can be created.

Figure 4:
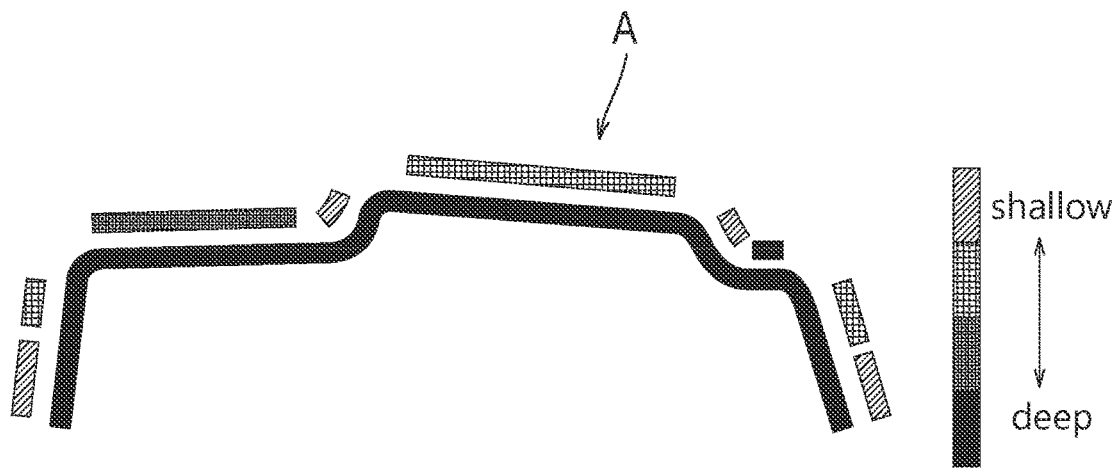
FIG. 4 is a diagram typically showing a resin molded product according to the embodiment of the present invention.

In the embodiment to form the resin molding mold 1 on the basis of such data, as shown in FIG. 4, ups and downs to be formed on the surface of the resin molded product A appropriately change in size depending on locations.

Figure 5:
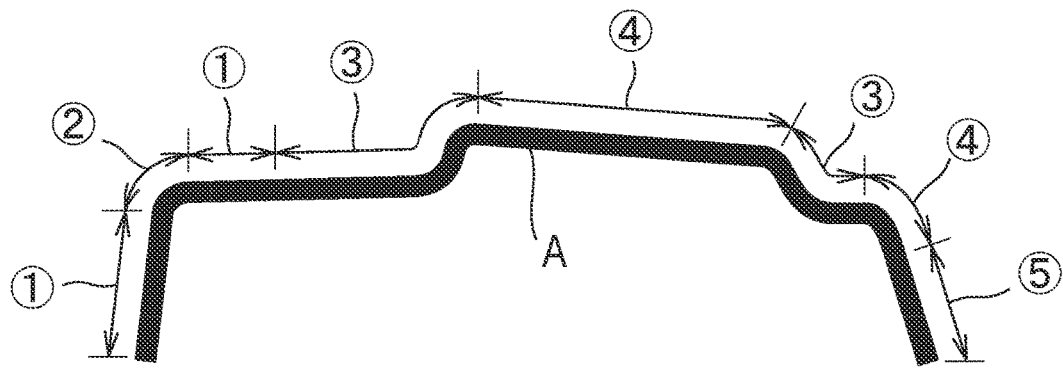
FIG. 5 is a diagram typically showing a resin molded product according to the embodiment of the present invention.

As a result, as typically shown in FIG. 5, even though the surface of one resin molded product A is a surface having different textures, the surface looks as if being seamless and can highly respond to demander's request. In the resin molded product A shown in FIG. 5, appropriate adjustments for the size of ups and downs of the surface, as typically shown in FIG. 4, allows to achieve an appearance as if a boundary between each surface is seamless such as (1) leather pattern (large pattern), (2) geometrical pattern (diamonds), (3) leather pattern (fine), (4) geometrical pattern (circle), and (5) pear skin texture (medium), which has completely different texture at first sight.

In this case, the resin molding mold manufacturing system S is to achieve the recesses and projections forming step to manufacture the resin molding mold 1. The recesses and projections forming step is one step in the method of manufacturing the resin molding mold 1 according to the embodiment. A method of manufacturing the resin molded product A will be described later.

The mold raw material 10 can function as the resin molding mold 1 in the state in which processing by the laser processing machine LP is performed. However, in the embodiment, when the thickness of the resin layer 4 disposed on the mold raw material 10 is set to 50 to 800 μm, the mold raw material 10 can be used as not only the resin molding mold 1, and the recesses and projections 6 is formed on the surface of the resin layer 4, so that a desired surface shape, i.e., a surface having a desired texture can be set. The mold raw material 10 which can also function as the resin molding mold 1 which does not form the recesses and projections 6 will be described with reference to FIG. 6 to FIG. 9.

The resin molding mold 1 is characterized by including the mold main body 2, as shown in FIGS. 6 to 9, and the resin layer 4 which is exposedly formed on a mold surface 22 side of the mold main body 2, is made of a heat-resistant complex material containing the synthetic resin 4a and the ceramic powder particle 4b, and has a thickness of 50 to 800 μm.

The resin molding mold 1 includes the mold main body 2 and the resin layer 4. The mold main body 2 forms the appearance of the resin molding mold 1, and is made of a metal such as iron or various alloys in the embodiment.

The mold main body 2 itself can be preferably used as a mold for molding a resin. In the embodiment, the resin layer 4 is arranged on the mold surface 22 on one surface side used in resin molding on the mold main body 2. In the embodiment, it is assumed that, as the resin molded product A, the synthetic resin 4a cured at a low temperature of 200° C. or less is used. For this reason, as a mold material used as the mold main body 2, various existing material can be applied. Thus, a raw material except for a metal may be used as the mold raw material, a raw material forming a porous shape as an entire mold material or as a surface shape may be used. In addition, even the metal raw material may be formed by an existing selective laser sintering method by means of a 3D printer.

Figure 6:
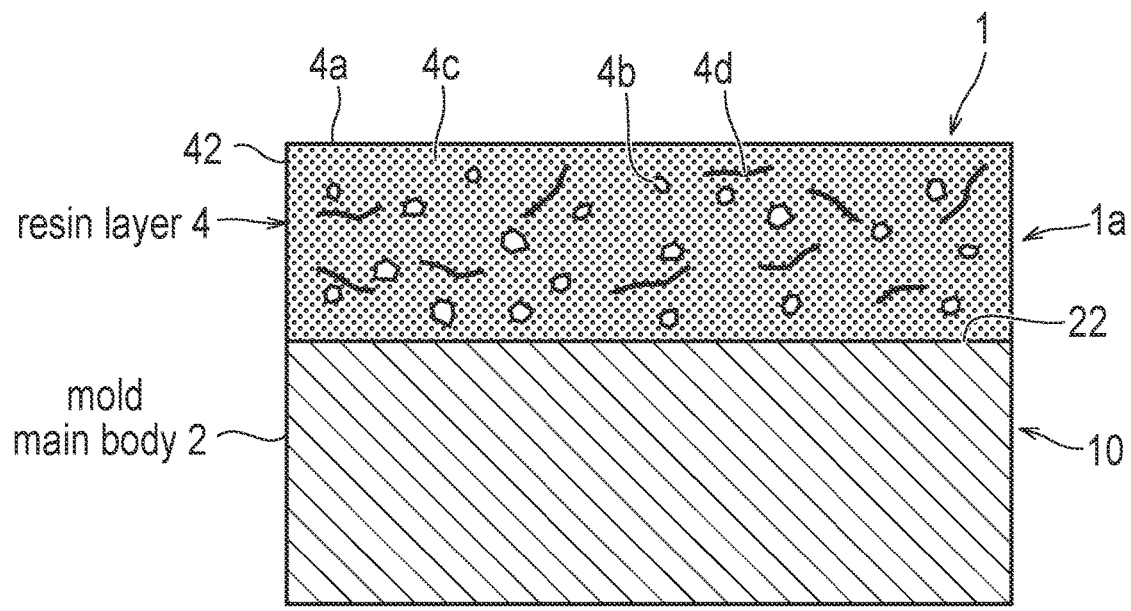
FIG. 6 is an end view for explaining a structure of a resin molding mold (mold raw material) according to the embodiment of the present invention.
Figure 7:
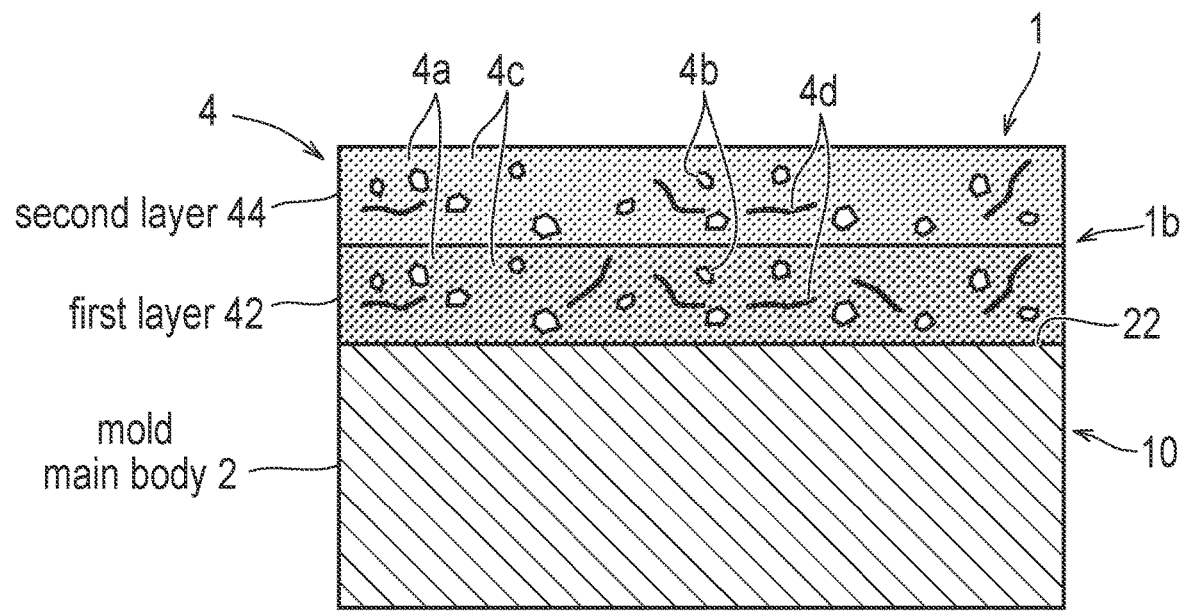
FIG. 7 is an end view for explaining a structure of a resin molding mold (mold raw material) according to the embodiment of the present invention.
Figure 8:
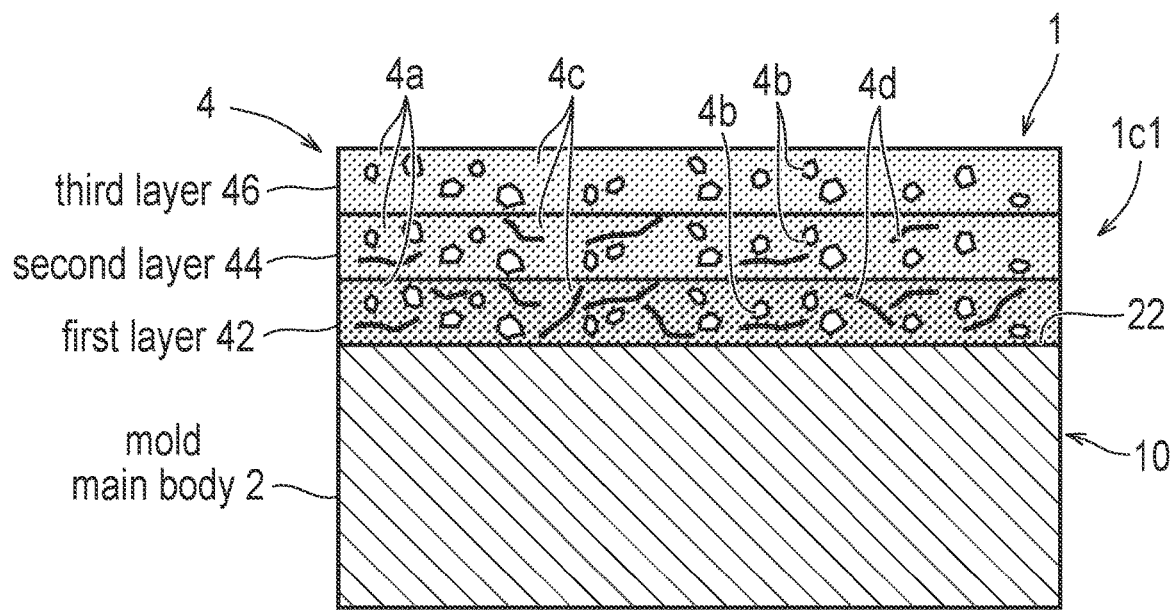
FIG. 8 is an end view for explaining a structure of a resin molding mold (mold raw material) according to the embodiment of the present invention.
Figure 9:
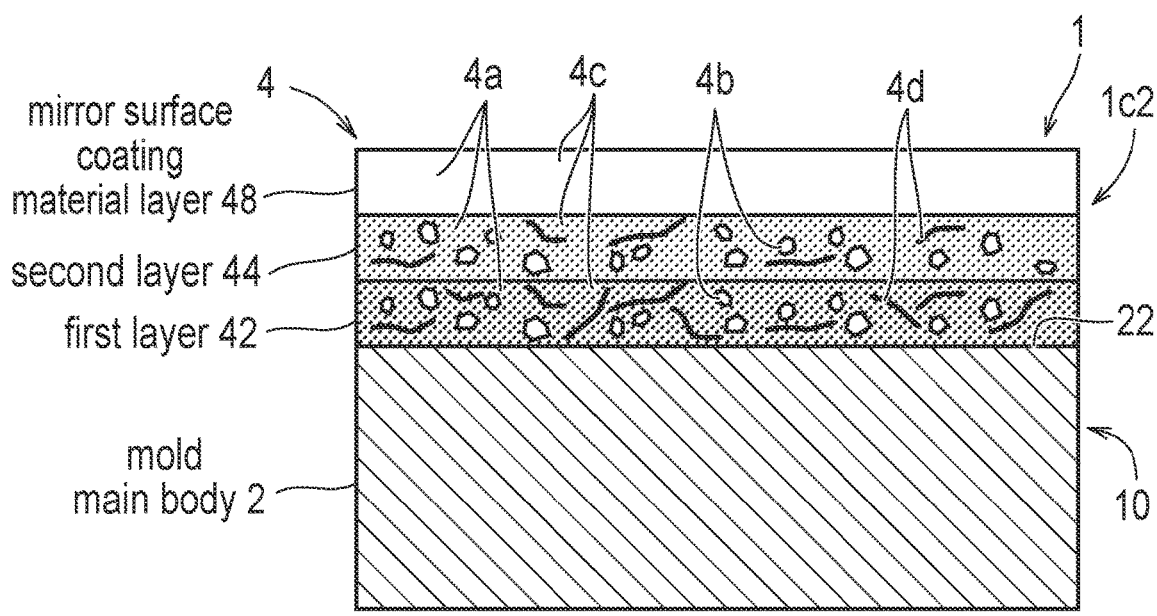
FIG. 9 is an end view for explaining a structure of a resin molding mold (mold raw material) according to the embodiment of the present invention.

The resin layer 4, as shown in FIG. 6 to FIG. 9, may include a single layer, two layers, or three layers as long as the layer 4 is formed on the mold surface 22 side of the mold main body 2. In the embodiment, the resin molding mold 1 having a single layer as the resin layer 4 is shown in FIG. 6. The resin molding mold 1 having two layers as the resin layer 4 is shown in FIG. 7. The resin molding mold 1 having three layers as the resin layer 4 is shown in FIG. 8 and FIG. 9. In the embodiment, for descriptive convenience, a first layer 42, a second layer 44, a third layer 46, and a mirror surface coating material layer 48 are shown.

The resin layer 4 is a so-called heat-resistant complex material containing the synthetic resin 4a and the ceramic powder particle 4b, in manufacturing, diluent solvent 4c. The resin layer 4 may be configured by not only a single layer but also a plurality of layers, and the entire thickness of the resin layer 4 may be 50 to 800 μm. The resin layer 4 shown in FIG. 6 to FIG. 8 further contains inorganic fibers 4*d*. The mirror surface coating material layer 48 shown in FIG. 9 is made of a mirror surface coating material. The diluent solvent 4*c* is evaporated to make the completed resin molding mold 1 free from the diluent solvent 4*c*. However, in the drawing, for descriptive convenient, the diluent agent 4*c* is also shown.

The synthetic resin 4*a* is a main component of the resin layer 4. The synthetic resin 4*a* fulfills a role of keeping the resin layer 4 in a predetermined shape while mixing the ceramic powder particle 4*b* and the inorganic fibers 4*d*. As an example of the synthetic resin 4*a*, for example, a resin such as an epoxy resin, an acrylic resin, a polyacetal resin, polyamide resin, a polyimide resin, a polyurethane resin, a polyester resin, a polyethylene resin, polycarbonate resin, a polypropylene resin, a silicon resin, a fluoro resin, a melamine resin, a urea resin, a phenolic resin, a phthalic resin, a styrene resin, a cellulose resin, a vinyl chloride resin, a vinyl acetate resin may be solely used, or a mixture thereof may be used.

The ceramic powder particle 4*b* corresponds to an aggregate to give desired strength to the resin layer 4. More specifically, the ceramic powder particle 4*b* gives strength to external force in a direction in which the resin layer 4 is compressed. The ceramic powder particle 4*b* accounts for 45 to 65% of the entire resin layer 4. The ceramic powder particle 4*b* more preferably accounts for 50 to 60% of the entire resin layer 4, and still more preferably 52 to 57% of the entire resin layer 4. As the ceramic powder particle 4*b*, alumina or ceramic is used, and a powder particle having a grain diameter of 0.1 to 70 μm is desirably used. The ceramic powder particle 4*b* has a porous shape, and can adsorb gas generated in a resin molding state from an exposed surface part.

As an example of the diluent solvent 4*c*, in the embodiment, an organic solvent such as ethyl cellosolve monoacetate which is ordinarily lowly-volatile is used. As a matter of course, since the diluent solvent 4*c* evaporates in manufacturing, not only the ethyl cellosolve monoacetate but also various existing volatile solvents can be applied. The diluent solvent 4*c* almost entirely evaporates and does not remain in the resin layer 4. However, for descriptive convenience, the diluent solvent 4*c* is shown in FIG. 6 to FIG. 9.

The inorganic fibers 4*d* is to give desired strength to the resin layer 4 together with the ceramic powder particle 4*b*. The inorganic fibers 4*d*, which is different from the ceramic powder particle 4*b*, gives strength to external force in a tensile direction to the resin layer 4. As an example of the inorganic fibers 4*d*, the inorganic fibers 4*d* such as glass fibers, carbon fibers, and silicone carbide fibers can be given. When the inorganic fibers 4*d* is mixed with the synthetic resin 4*a*, fibers, which are generally referred to as staple fibers, have a fiber length of 5 to 200 μm, and a fiber diameter of 0.05 to 1.5 μm are used.

Subsequently, the first layer 42, the second layer 44, the third layer 46, and the mirror surface coating material layer 48 which can configure the resin layer 4 will be sequentially described. The first layer 42 and the second layer 44 are formed by a heat-resistant complex material obtained by combining the first layer 42, the ceramic powder particle 4*b*, the inorganic fibers 4*d*, and the diluent solvent 4*c* to each other. The first layer 42 and the second layer 44 are different from each other in a compounding ratio of the ceramic powder particle 4*b* and the inorganic fibers 4*d*. More specifically, in the embodiment, since the first layer 42 is directly applied on the mold surface 22 of the mold main body 2, fixing force enough to reliably apply the first layer 42 to the mold main body 2 is required. In the configuration shown in FIG. 7 to FIG. 9, the first layer 42 requires high strength to directly or indirectly support the second layer 44, the third layer 46, or the mirror surface coating material layer 48. More specifically, the strength of the resin layer 4 and adhesive properties to the mold main body 2 tend to be high when the content of the inorganic fibers 4*d* is high. Thus, in the embodiment, the content of the inorganic fibers 4*d* in the first layer 42 is higher than that in the second layer 44.

The third layer 46 is maximally exposed to the outside. The third layer 46 is made of a heat-resistant complex material obtained by combining the synthetic resin 4*a* and the ceramic powder particle 4*b* to each other. The third layer 46 does not contain the inorganic fibers 4*d*, or, if contain the inorganic fibers 4*d*, has a content lower than in the second layer 44.

The mirror surface coating material layer 48 contains a mirror surface coating material as a main component. As the mirror surface coating material, for example, by using a thermosetting resin having a heat conductivity of 0.10 W/m·k or more and 0.99 W/m·k or less, the mirror surface coating material layer 48 is formed. In addition, as the thermosetting resin used for the mirror surface coating material layer 48, a material having a high thermal insulation is used. For example, as the thermosetting resin used for the mirror surface coating material layer 48, a thermosetting resin having a heat conductivity of 0.10 W/m·k or more and 0.99 W/m·k or less is used. As the thermosetting resin using the mirror surface coating material layer 48, a phenol resin, an alkyd resin, a melamine urea resin, an epoxy resin, a polyurethane resin, a silicone resin, a chlorinated rubber resin, a vinyl acetate resin, an acrylic resin, a vinyl chloride resin, a fluorocarbon resin, cellulose, a polystyrene resin, or the like is used, and both a simple substance and a copolymer can be used.

In the embodiment, on the basis of the configuration, as shown in FIG. 6 to FIG. 9, as four types of resin layers 4, i.e., a single-layer type, a two-layer types 1*b*, a three-layer type (1) 1*c*1, and a three-layer type (2) 1*c*2 are configured. However, the resin layer 4 according to the present invention is not limited to the modes shown in FIG. 6 to FIG. 9. More specifically, a configuration including five or more layers or the resin layer 4 having a two-layer structure different from that in the mode in FIG. 7 in which the mirror surface coating material layer 48 is formed on the first layer 42 may be used. Four types of resin molding molds 1, including, as the resin layers 4, the single-layer type 1*a*, the two-layer type 1*b*, the three-layer type (1) 1*c*1, and the three-layer type (2) 1*c*2 will be sequentially explained below.

In the resin layer 4 included in the resin molding mold of the single-layer type 1*a*, as shown in FIG. 6, only the first layer 42 is formed on the mold surface 22 of the mold main body 2. As described above, since the first layer 42 is formed to have the highest strength, the resin molding mold 1 having the resin layer 4 of the single-layer type 1*a* is excellent in strength and durability.

The resin layer 4 including the resin molding mold 1 of the two-layer type 1*b*, as shown in FIG. 7, is the resin layer 4 having a mode in which the shape of the surface of the second layer 44 is reflected on the resin molded product A while the first layer 42 is strongly fixed to the mold surface 22 of the mold main body 2. Thus, the surface shape of the molded resin molded product A, in other words, the texture of the surface is different from that of the resin molding mold 1 having the resin layer 4 included in the resin molding mold 1 of the single-layer type 1a. In this case, the heat-resistant complex material configuring the resin layer 4 has a gloss level which increases when the contents of the ceramic powder particle and the inorganic fibers are reduced.

The resin layer 4 included in the resin molding mold 1 of the three-layer type (1) 1c1, as shown in FIG. 8, includes the first layer 42 which is strongly fixed to the mold surface 22 of the mold main body 2 and supports the second layer 44, and the third layer 46 which has a small content of the inorganic fibers 4d or does not contain the inorganic fibers 4d supported by the second layer 44 and is exposed on the surface of the resin layer 4. Thus, the surface shape of the molded resin molded product A, that is, the texture of the surface is different from those in the resin molding molds 1 having the resin layers 4 of the single-layer type 1a or the two-layer type 1b.

The resin layer 4 included in the resin molding mold 1 of the three-layer type (2) 1c2, as shown in FIG. 9, includes the first layer 42 which is strongly fixed to the mold surface 22 of the mold main body 2 and supports the second layer 44, and the mirror surface coating material layer 48 is exposed on the surface of the resin layer 4, which does not contain the inorganic fibers 4d or the ceramic powder particle 4b. Thus, the surface shape of the molded resin molded product A, that is, the texture of the surface is different from those in the resin molding molds 1 having the resin layers 4 of the single-layer type 1a, the second-layer type 1b, or the three-layer type (2) 1c2.

In the resin molding mold 1 according to the embodiment, as shown in FIG. 1 to FIG. 5, the recesses and projections 6 is formed on the surface of the resin layer 4 to make it possible to make the resin molding mold 1 having a surface shape different from those in the resin molding molds 1 shown in FIG. 6 to FIG. 9. In other words, the resin molding mold 1 before the recesses and projections 6 is formed on the surface of the resin layer 4 fulfills the role of the mold raw material 10.

More specifically, the resin molding mold 1 according to the embodiment includes the resin layer 4 exposedly formed on the mold surface 22 side of the mold main body 2 and made of a heat-resistant complex material containing the synthetic resin 4a and the ceramic powder particle 4b, and is characterized in that the resin layer 4 is partially dug to form the recesses and projections 6. In FIG. 6 to FIG. 9, for descriptive convenience, the diluent solvent 4c which is contained in the resin layer 4 in the manufacturing step and is evaporated on completion and not contained in the resin layer 4 is daringly shown.

In this case, the word "digging" is not limited to a process of simply forming a groove or a process of forming a hole. The "digging" is a concept including all processes of digging a surface to molding the surface in a desired shape.

Figure 10:
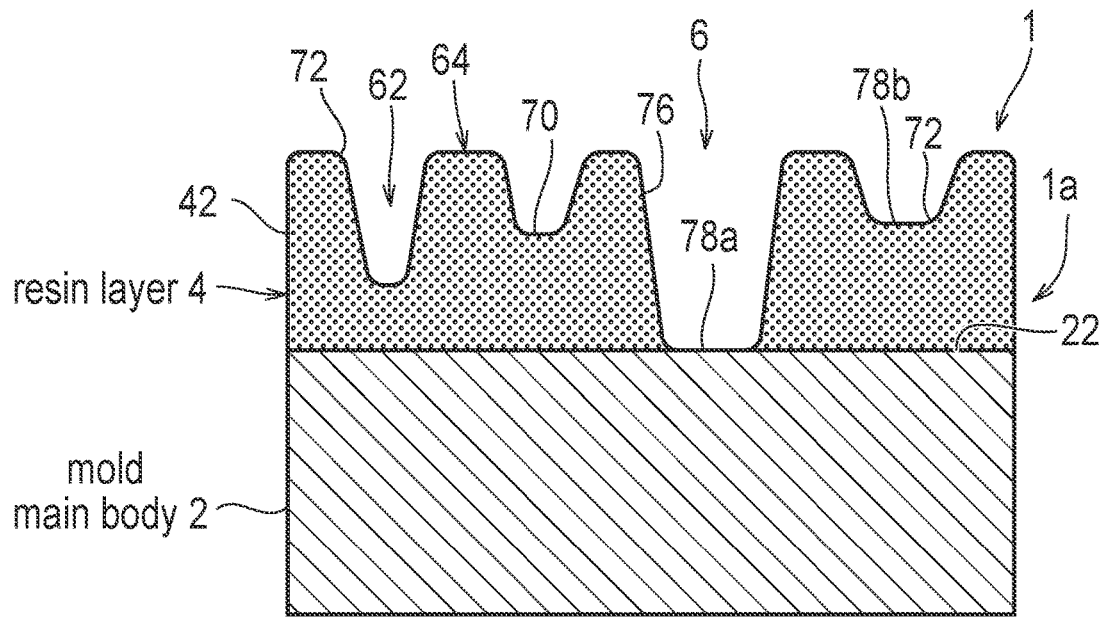
FIG. 10 is an end view for explaining a structure of a resin layer according to the embodiment of the present invention.
Figure 11:
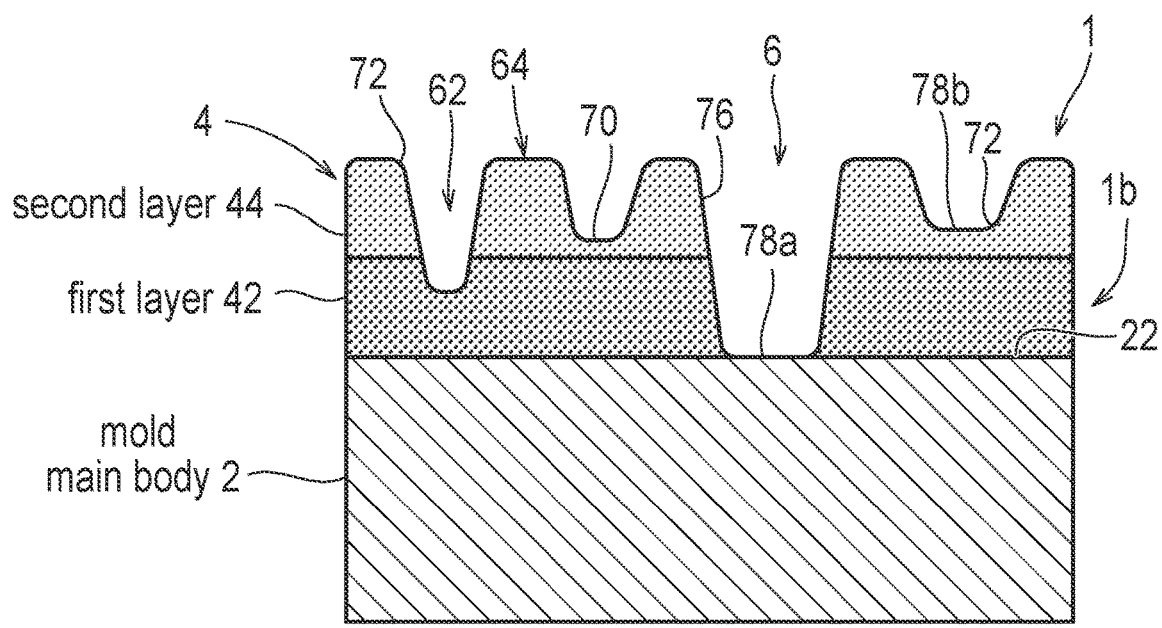
FIG. 11 is an end view for explaining a structure of a resin layer according to the embodiment of the present invention.
Figure 12:
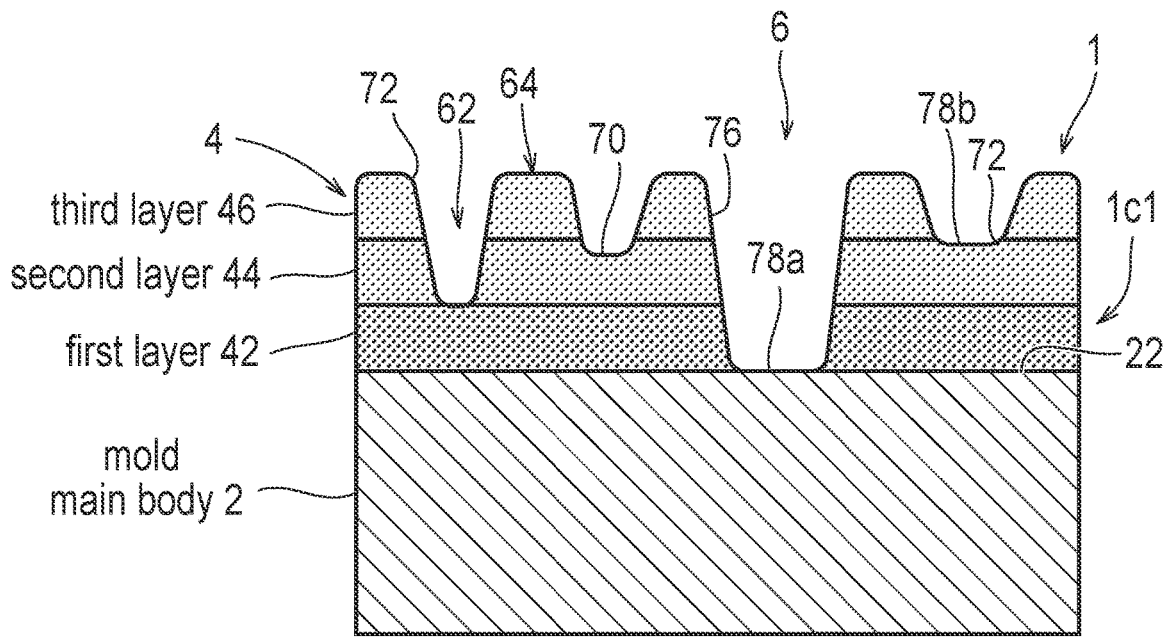
FIG. 12 is an end view for explaining a structure of a resin layer according to the embodiment of the present invention.
Figure 13:
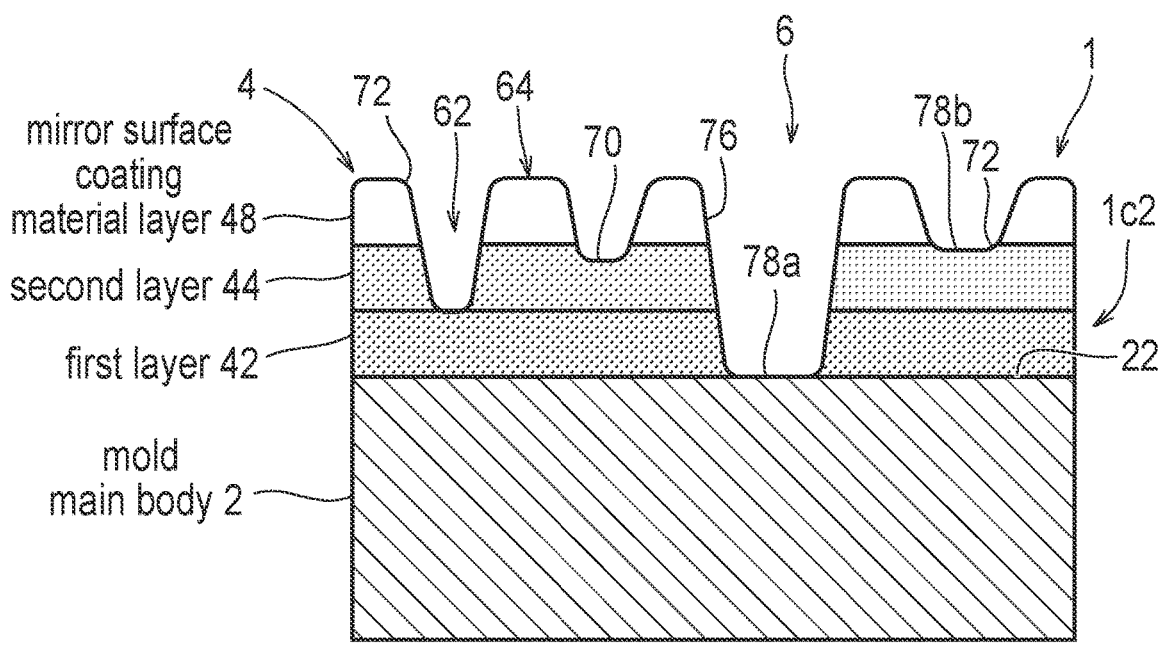
FIG. 13 is an end view for explaining a structure of a resin layer according to the embodiment of the present invention.

The resin molding mold 1, according to the embodiment, including the resin layer 4 in which the recesses and projections 6 is formed will be described below with reference to FIG. 10 to FIG. 13. The resin molding mold 1 of the single-layer type 1a including the resin layer 4 in which the recesses and projections 6 is formed is shown in FIG. 10. The resin molding mold 1 of the two-layer type 1b including the resin layer 4 in which the recesses and projections 6 is formed is shown in FIG. 11. The resin molding mold 1 of the three-layer type (1) 1c1 including the resin layer 4 in which the recesses and projections 6 is formed is shown in FIG. 12. The resin molding mold 1 of the three-layer type (2) 1c2 including the resin layer 4 in which the recesses and projections 6 is formed is shown in FIG. 13. The resin molding molds 1 shown in FIG. 10 to FIG. 13 correspond to FIG. 6 to FIG. 9, respectively.

In this case, in the resin molding mold 1 according to the embodiment, the recesses and projections 6 is formed on only the resin layer 4. In other words, the formation of the recesses and projections 6 does not influence the shape of the mold main body 2 at all. As a result, the change of the recesses and projections 6 can be achieved by replacing the resin layers 4 without replacing the mold main body 2. More specifically, trial manufacture of the resin layer 4 in which the recesses and projections 6 being capable of expressing a desired surface shape is achieved can be repeatedly performed by means of the same mold main body 2 without replacing the mold main bodies 2 while appropriately using the resin layers 4 in FIG. 6 to FIG. 9 and the resin layers 4 having other configurations. This contributes to a reduction in number of parts related to the trial manufacture of the resin molding mold 1 and to saving troubles.

The recesses and projections 6, as shown in FIG. 10 to FIG. 13, has a tapered recess portion 62 and a tapered projection portion 64. The tapered recess portion 62 is a recess obtained by appropriately digging the resin layer 4. The tapered recess portion 62 has a bottom surface 70. The bottom surface 70 has a mold bottom surface 78a exposing the mold surface 22 of the mold main body 2 and a resin bottom surface 78b formed by any one of the resin layers 4.

More specifically, in the embodiment, the tapered projection portion 64 is a portion interposed in the tapered recess portion 62. That is, the tapered projection portion 64 is a portion projecting from the bottom surface 70. In addition, each of the tapered recess portion 62 and the tapered projection portion 64 has a radial portion 72 and a cutout end face 76. The radial portion 72 is a radial surface formed between the upper end of the projection portion and the bottom surface 70 at the lower end. The cutout end face 76 is an exposed portion of the section of the resin layer 4 formed by digging the resin layer 4. The cutout end face 76 has various angles set depending on the shapes of the tapered recess portion 62 and the tapered projection portion 64.

More specifically, the recesses and projections 6 shown in FIG. 10 to FIG. 13 has the tapered recess portion 62 tapered toward the mold surface 22 and the rounded (curved) radial portion 72. In this manner, a removing step in manufacture of the resin molded product A can be smoothly performed. More specifically, an angle facing the cutout end face 76 functions as a so-called "draft angle" when the resin molded product A is manufactured. By using the "draft angle", the pattern depth of the recesses and projections 6 which can suppress scratches, i.e., so-called galling in removement of a molded product, that is, the arrangement of the mold bottom surface 78a and the depth position of the resin bottom surface 78b can be determined randomly.

In other words, in the embodiment, an any depth position of the resin bottom surface 78b sets the pattern depth of the any recesses and projections 6. In addition, when the angle of the cutout end face 76 is appropriately set to make it possible to arbitrarily set the pattern depth of the recesses and projections 6 suitable for a draft angle set for each portion of the mold.

Subsequently, the resin molding molds 1 having the resin layers 4 of different types will be sequentially explained with reference to FIG. 10 to FIG. 13.

In the resin molding mold 1 having the resin layer 4 of the single-layer type 1a, as shown in FIG. 10, the recesses and projections 6 is formed on the first layer 42. On the cutout end face 76 and the resin bottom surface 78b of the recesses and projections 6, only the first layer 42 is naturally exposed. As a matter of course, as shown in FIG. 10, the position of the resin bottom surface 78*b* in the thickness direction of the resin layer 4 can be adjusted suitably and, in the range of the thickness of the resin layer 4, an appropriate combination of the mold bottom surface 78*a* serving as the deepest bottom surface 70 and the resin bottom surfaces 78*b* set at various depths forms the tapered recess portions 62 and the tapered projection portions 64, which have various shapes.

The resin molding mold 1 (single-layer type 1*a*) having the single resin layer 4 is excellent in strength and durability while making the quality of the surface of the resin molded product A high.

In the resin layer 4 included in the resin molding mold 1 of the two-layer type 1*b*, as shown in FIG. 11, the recesses and projections 6 is formed over the first layer 42 and the second layer 44. In the resin layer 4 of the resin molding mold 1 of the two-layer type 1*b*, the first layer 42 fulfills a role of an adhesive layer to the mold surface 22, and the second layer 44 has, e.g., a content of the inorganic fibers 4*d* which is smaller than that of the first layer 42 to obtain characteristics which are excellent in processability of laser processing.

In the resin molding mold 1 of the two-layer type 1*b*, the resin layer 4 has a plurality of layers having different ratios of the synthetic resin 4*a* and the ceramic powder particle 4*b*, and has the cutout end face 76 obtained by exposing the plurality of layers at a position where the recesses and projections 6 is formed.

In this case, in the recess portion forming the recesses and projections 6 is configured such that the resin bottom surface 78*b* and the mold bottom surface 78*a* serving as a plurality of layers make the bottom surface 70. The cutout end face 76 of the recesses and projections 6 is formed by exposing the sections of the first layer 42 and the second layer 44, and is formed by exposing only the first layer 42. The resin bottom surface 78*b* is formed by exposing the first layer 42 or exposing the second layer 44. The first layer 42 also fulfills the role of an adhesive layer to the mold surface 22, and the second layer 44 also serves as a gas draining/absorbing layer (in molding). More specifically, the second layer 44 contains the ceramic powder particle 4*b* serving as a porous material and having higher capability to absorbing gas generated in molding of the resin molded product A than that of the ceramic powder particle 4*b* in the first layer 42. In addition, the second layer 44 has a surface structure in which gas generated in molding of the resin molded product A easily escapes outside. As shown in FIG. 11, the position of the resin bottom surface 78*b* in the thickness direction of the resin layer 4 can be suitably adjusted as in FIG. 10.

In the resin layer 4 included in the resin molding mold 1 of the three-layer type (1) 1*c*1, as shown in FIG. 12, the recesses and projections 6 is formed over the first layer 42, the second layer 44, and the third layer 46. The first layer 42 fulfills the role of an adhesive layer to the mold surface 22, and the second layer 44 has characteristics which are excellent in processability of laser processing by making the content of, for example, the inorganic fibers 4*d* smaller than that in the first layer 42. The third layer 46, for example, has a content of the inorganic fibers 4*d* further smaller than that in the second layer 44 or does not contain the inorganic fibers 4*d* to have processability of laser processing which is better than that of the second layer 44. More specifically, the third layer 46 forms a fine surface shape which suppresses a skin layer from being formed at a flow end of a molded resin.

A cutout end face 76 of the recesses and projections 6 is formed by exposing the first layer 42, the second layer 44, and the third layer 46, by exposing the second layer 44 and the third layer 46, or by exposing only the third layer 46. The resin bottom surface 78*b* is formed by exposing the first layer 42, by exposing the second layer 44, or by exposing the third layer 46. As shown in FIG. 12, the position of the resin bottom surface 78*b* in the thickness direction of the resin layer 4 can be suitably adjusted as in FIG. 10 and FIG. 11.

In the resin molded mold 1 having the resin layer 4 of the three-layer type (2) 1*c*2, as shown in FIG. 13, the recesses and projections 6 is formed over the first layer 42, the second layer 44, and the mirror surface coating material layer 48. The first layer 42 fulfills the role of an adhesive layer to the mold surface 22, and the second layer 44 has a content of, for example, the inorganic fibers 4*d* lower than that in the first layer 42, to have excellent processability of laser processing. The mirror surface coating material layer 48 has a content of, for example, the inorganic fibers 4*d* further lower than that in the second layer 44 or does not contain the inorganic fibers 4*d* to have processability of laser processing which is better than that of the second layer 44.

More specifically, the mirror surface coating material layer 48 also serves as a low-friction layer which reduces resin friction in molding. In other words, desired gloss on the surface of the resin molded product A is provided by the mirror surface coating material layer 48, and the cutout end face 76 of the recesses and projections 6 which can smoothly perform the removing step has surfaces that the first layer 42, the second layer 44, and the mirror surface coating material layer 48; the second layer 44 and the mirror surface coating material layer 48; and only the mirror surface coating material layer 48 are respectively exposed. The resin bottom surface 78*b* has surfaces that the layer 42, exposes the layer 44, and expose the mirror surface coating material layer 48 are exposed. As in FIG. 13, the position of the resin bottom surface 78*b* can be suitably adjusted in the thickness direction of the resin layer 4 as in FIG. 10 to FIG. 12.

More specifically, in the two-layer type 1*b*, the three-layer type (1) 1*c*1, and the three-layer type (2) 1*c*2 having the plurality of resin layers 4, the ratio of the inorganic fibers 4*d* progressively decreases when the resin layers 4 are progressively laminated from the mold surface 22 of the mold main body 2. The ratio of the inorganic fibers 4*d* progressively decreases when the plurality of resin layers 4 are laminated from the mold surface 22 of the mold main body 2, and, on the resin layer 4 farthest from the mold surface 22, the mirror surface coating material layer 48 (three-layer type (2) 1*c*2) which does not contain the inorganic fibers 4*d* (three-layer type (1) 1*c*1) or is made of a different material is formed.

In the embodiment, the surface can be independently coated. More specifically, a surface coating layer can be further formed on the surface of the resin layer 4. A coating layer 8 is a matte layer 82, a mirror surface coating layer 84, or a gloss adjusting layer 86. In addition, a surface coating having another function can also be applied. Furthermore, a matte layer to which various gloss adjusting particles are added and which is different from the above-mentioned matte layer may be configured.

Figure 14:
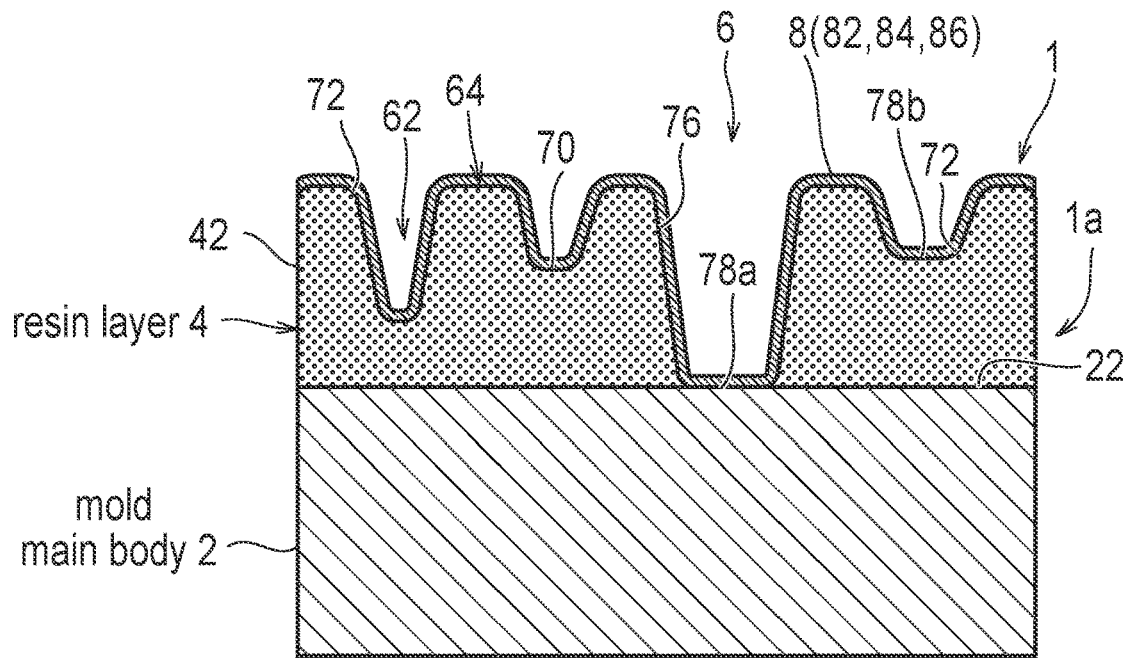
FIG. 14 is an end view for explaining a structure of a resin layer and a coating layer according to the embodiment of the present invention.
Figure 15:
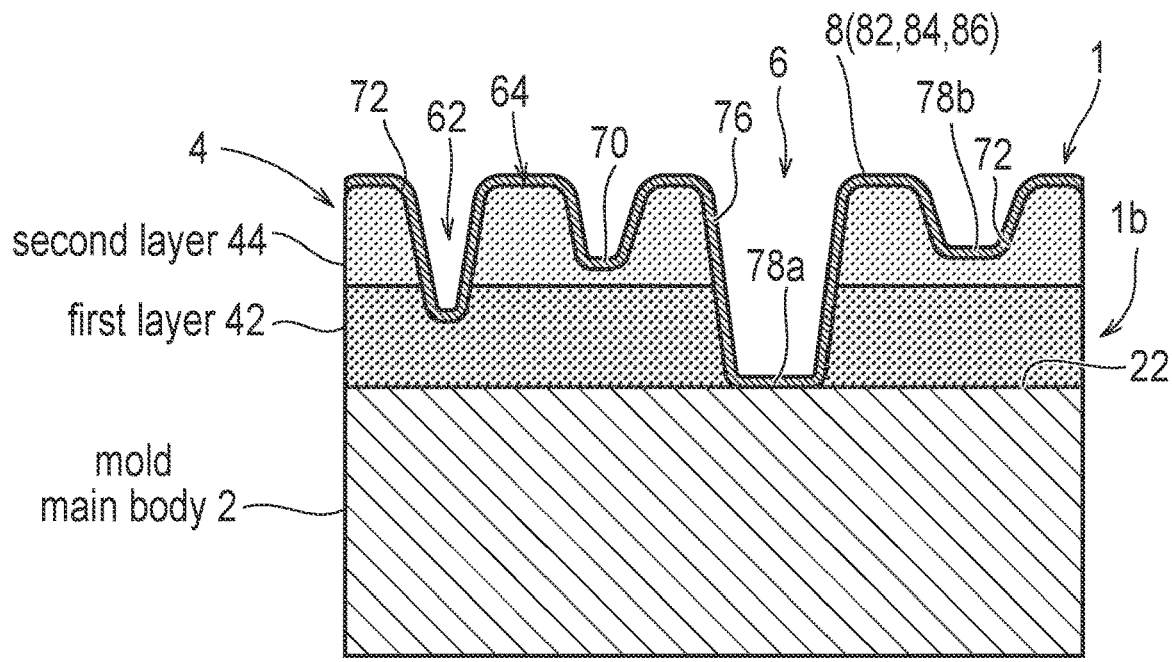
FIG. 15 is an end view for explaining a structure of a resin layer and a coating layer according to the embodiment of the present invention.
Figure 16:
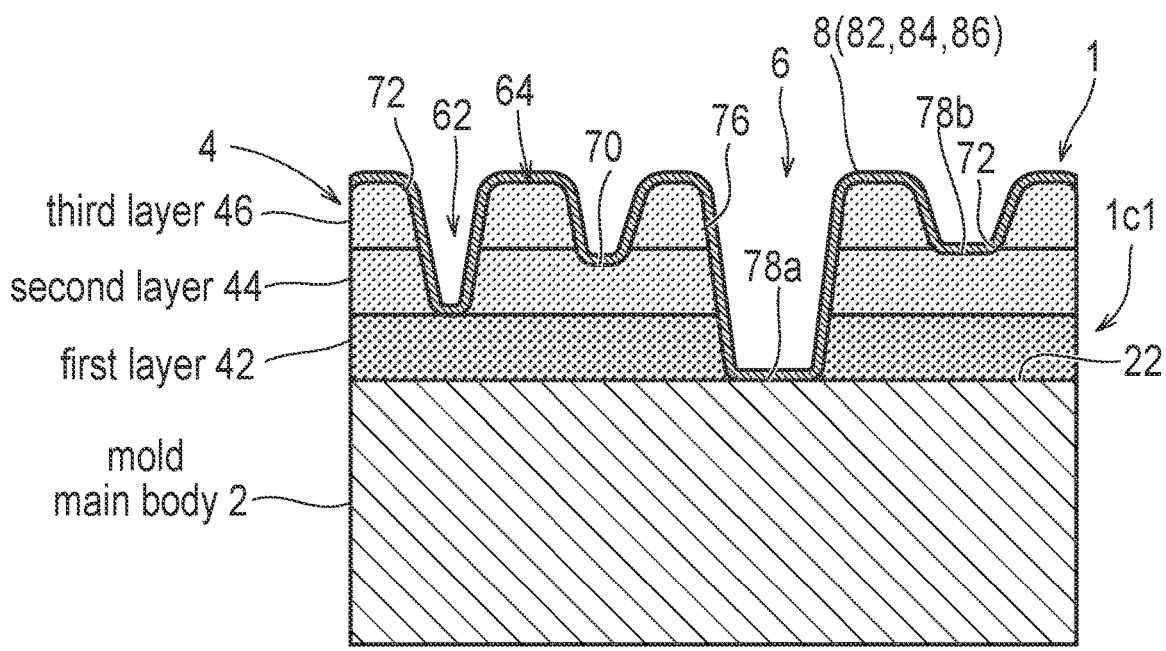
FIG. 16 is an end view for explaining a structure of a resin layer and a coating layer according to the embodiment of the present invention.
Figure 17:
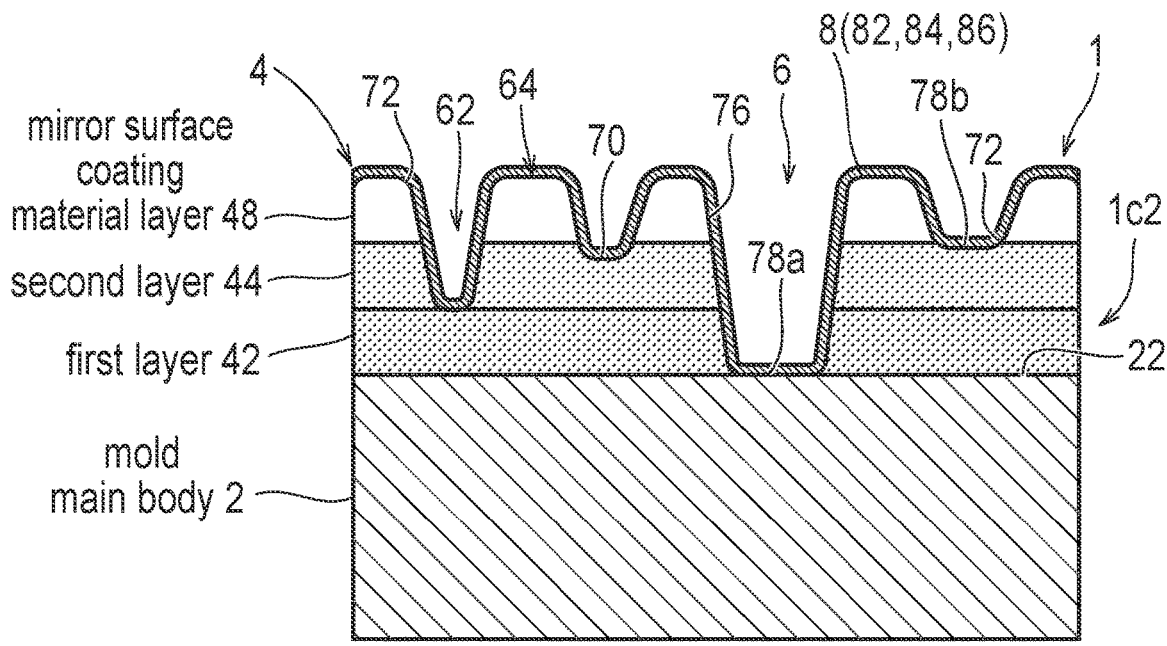
FIG. 17 is an end view for explaining a structure of a resin layer and a coating layer according to the embodiment of the present invention.

The resin molding mold 1 including the resin layer 4 in which the coating layer 8 is formed will be described with reference to FIG. 14 to FIG. 17. The resin molding mold 1 of the single-layer type 1*a* including the resin layer 4 in which the coating layer 8 is formed is shown in FIG. 14. The resin molding mold 1 of the two-layer type 1*b* including the resin layer 4 in which the coating layer 8 is formed is shown in FIG. 15. The resin molding mold 1 of the three-layer type (1) 1*c*1 including the resin layer 4 in which the coating layer 8 is formed is shown in FIG. 16. The resin molding mold 1 of the three-layer type (2) 1*c*2 including the resin layer 4 in which the coating layer 8 is formed is shown in FIG. 17. The resin molding molds 1 shown in FIG. 14 to FIG. 17 correspond to FIG. 10 to FIG. 13, respectively.

In this case, in the embodiment, when the mirror surface coating material layer 48 is further formed on the surface of the resin layer 4 having the recesses and projections 6, the degree of gloss of the resin molded product A manufactured by the resin molding mold 1 can be adjusted to a desired degree of gloss while satisfying the adhesiveness of the resin layer 4 to the mold main body 2 made of metal and the reproducibility of the uneven sample M by laser processing. In other words, the mold raw material 10 which has the resin layer 4 of a different type and can reproduce the surface shape of the uneven sample M shown in FIG. 1 is selected, and a desired frosting process can also be applied to a product in which the shape of the uneven sample M (see FIG. 1) is reproduced most faithfully, The resin layer 4 containing many inorganic fibers 4*d* and a plenty of ceramic powder particle 4*b* tends to have high strength and to be excellent in adhesiveness to the mold surface 22 of the mold main body 2 made of metal. When the content of the inorganic fibers 4*d* or the ceramic powder particle 4*b* becomes low, the laser processability is improved, and the recesses and projections 6 which is more faithful to the sample may be processed.

When the resin molding mold 1 as described above is used, depending on the surface shape of the uneven sample M (see FIG. 1), the resin molded product A which is more faithfully reproduced can be manufactured.

Figure 18:
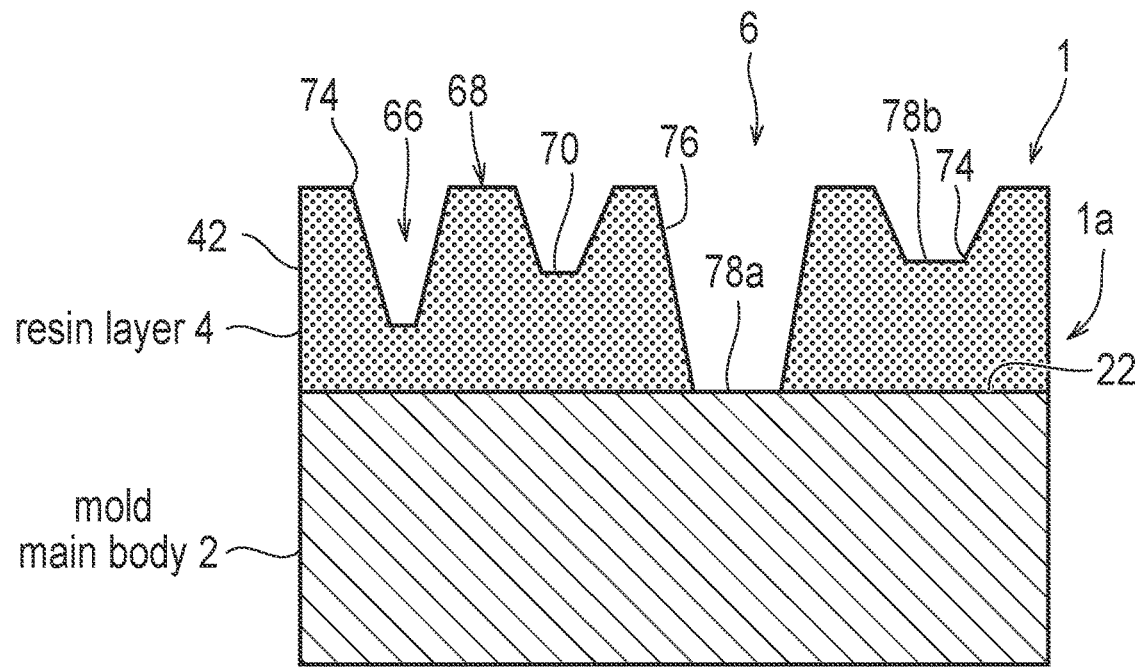
FIG. 18 is an end view for explaining a structure of, especially, a recesses and projections of a resin layer according to the embodiment of the present invention.
Figure 19:
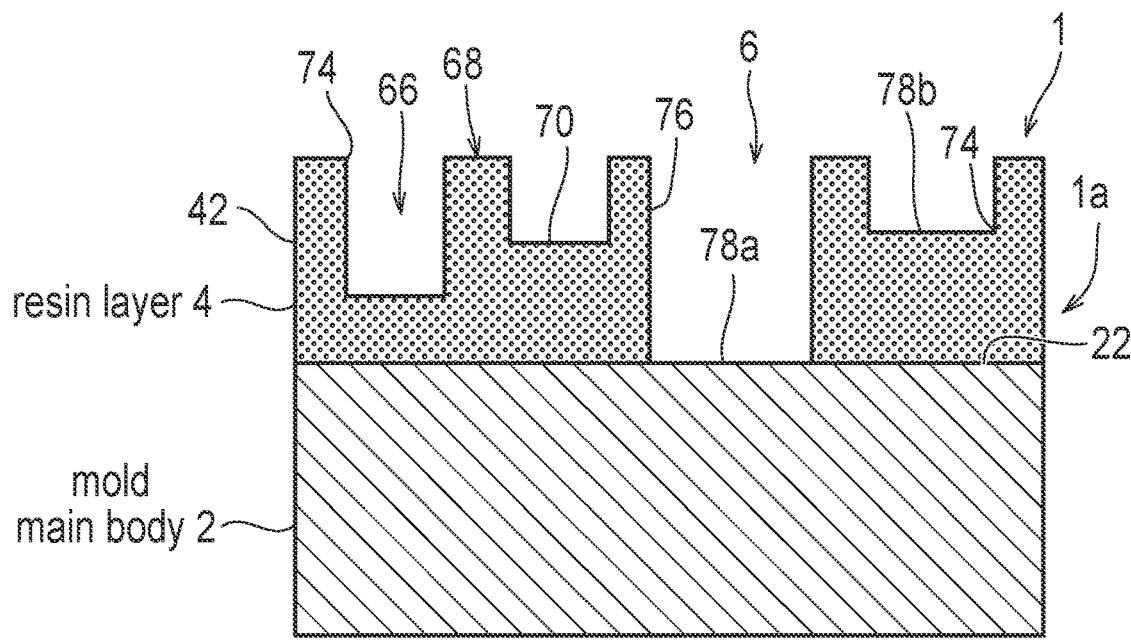
FIG. 19 is an end view for explaining a structure of, especially, a recesses and projections of a resin layer according to the embodiment of the present invention.

Furthermore, the recesses and projections 6 is not limited to a recesses and projections having a curved surface forming the recesses and projections 6. Although each of the recesses and projections 6 shown in FIG. 10 to FIG. 17 has the tapered recess portion 62 and the radial portion 72 to form a smoothly tapered shape, to have a shape tapered toward the mold surface 22, and to be cornerless (rounded). However, the recesses and projections 6 as shown in FIG. 18 and FIG. 19 may be used.

More specifically, a corner forming the recesses and projections 6 may be bent to form a bent portion 74. The recesses and projections 6 having the bent portion 74, as shown in FIG. 18, is different from the recesses and projections 6 shown in FIG. 10 to 17 in a curved surface connected to the radial portion 72, and the bent portion 74 forms a ridge line. In other words, the recesses and projections 6 shown in FIG. 18 has the tapered recess portion 62 which is acutely tapered and the angular, (sharply) tapered projection portion 64 which is tapered toward the mold surface 22.

Even though the above recesses and projections 6 is used, depending on the surface shape of the uneven sample M (see FIG. 1), the resin molded product A which faithfully represents the recesses and projections 6 can be manufactured.

Furthermore, the recesses and projections 6 is not limited to the tapered recess portion 62 having a tapered surface and the tapered projection portion 64. More specifically, the recesses and projections 6 may have a straight recess portion 66 projecting in a direction orthogonal to the surface direction of the mold surface 22 of the mold main body 2 and a straight projection portion 68. The recesses and projections 6 having a straight recesses portion 66 and the straight projection portion 68, as shown in FIG. 19, has the cutout end face 76 which projects in a direction orthogonal to the surface direction of the mold surface 22 of the mold main body 2. As a result, the direction of the cutout end face 76 is a direction parallel to the surface direction of the mold surface 22 of the mold main body 2. Although a mode in which the cutout end face 76 vertical to one surface is formed is shown in FIG. 19, as a matter of course, a mode in which the cutout end face 76 is inclined at a small angle as a "draft angle" in design is also included.

In addition, although the mode in which the recesses and projections 6 having the straight recess portion 66 and the straight projection portion 68 shown in FIG. 19, as in FIG. 18, and having the bent portion 74 is conveniently shown, as a matter of course, the recesses and projections 6 may include the straight recess portion 66, the straight projection portion 68, and the radial portion 72. In this case, the recesses and projections 6 having an appearance different from those in FIG. 18 and FIG. 19 is formed.

Even though the above recesses and projections 6 is used, depending on the surface shape of the uneven sample M (see FIG. 1), the resin molded product A which faithfully represents the recesses and projections 6 can be manufactured.

The recesses and projections 6 shown in FIG. 18 and FIG. 19 and the recesses and projections 6 (not shown) including the straight recess portion 66, the straight projection portion 68, and the radial portion 72 may further include the surface coating layers 8 shown in FIG. 14 to FIG. 17.

In this manner, in the resin molding mold 1 according to the embodiment, not only surface configuration, but also characteristics such as the presence/absence of laminated layers, the number of laminated layers, the shape of the recesses and projections 6, and the presence/absence of the coating layer 8 are appropriately used to make it possible to give a surface shape having a desired appearance to the resin molded product A.

Figure 20:
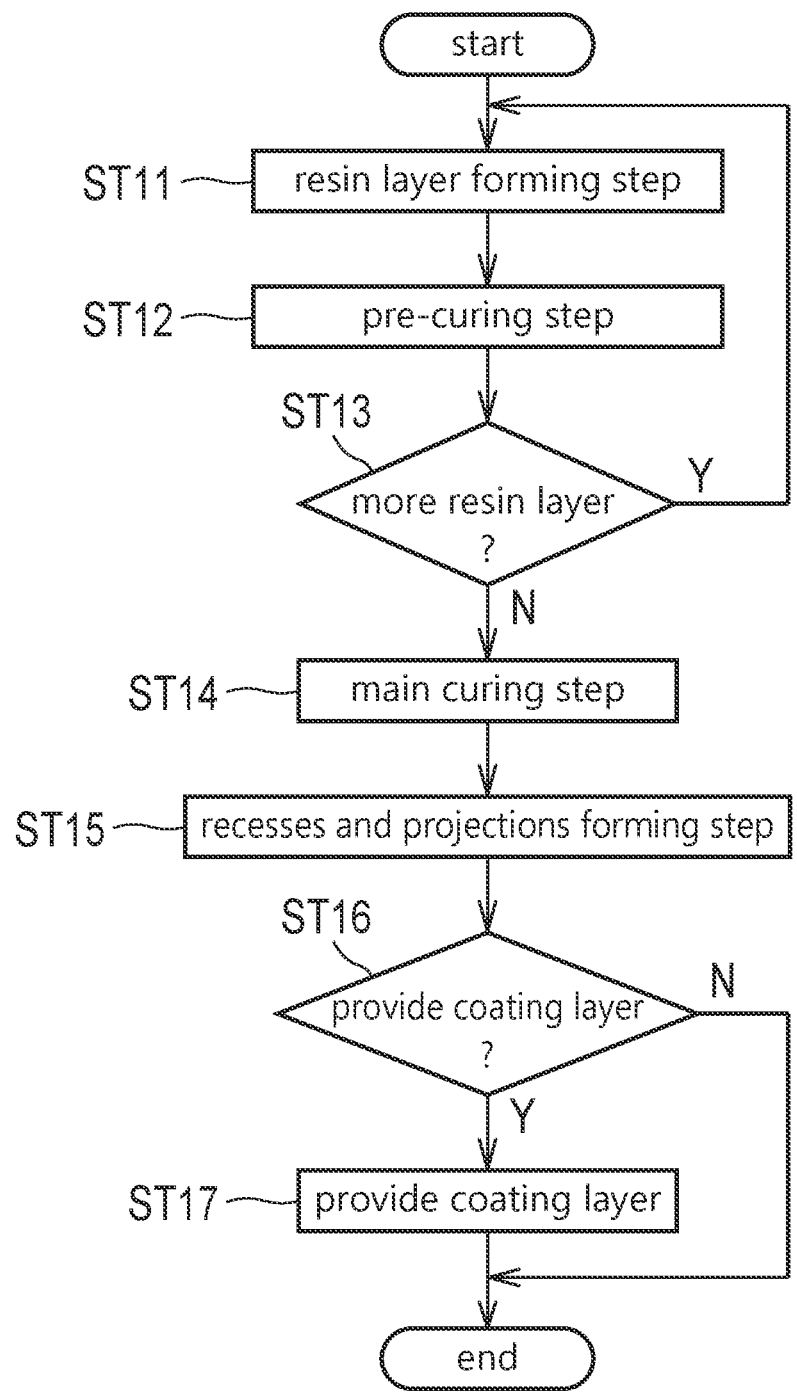
FIG. 20 is a flow chart for explaining a method of manufacturing a resin molding mold according to the embodiment of the present invention.

The resin molding mold 1 according to the embodiment is preferably produced by the method of manufacturing the resin molding mold 1 according to the embodiment shown in FIG. 20. The manufacturing method is preferably achieved by the resin molding mold manufacturing system S shown in FIG. 1.

More specifically, the method of manufacturing the resin molding mold 1 according to the embodiment is characterized by including the resin layer forming step, the pre-curing step, the main curing step, and the recesses and projections forming step.

In the resin layer forming step, on the mold surface 22 of the mold main body 2, the resin layer 4 made of a heat-resistant complex material containing the synthetic resin 4*a*, the ceramic powder particle 4*b*, and the diluent solvent 4*c* is formed. The resin layer forming step, in the embodiment, is performed by a spraying method of spraying a resin on, for example, the mold surface 22 of the mold main body 2 to have a predetermined thickness. However, the resin layer forming method is not limited to the spraying method. For example, as a mode of another resin layer forming step, a mode which sticks a resin sheet molded by a slip blade method, a doctor blade method, a roll method performing molding by using a roll in place of a doctor blade in the doctor blade method, a calendar method, a paper dipping method, a continuous pressing method, an injection molding method, a slice method slicing a block of mold, a squeeze method, a drawing method drawing a semi-cured resin, a shaving method shaving a block of resin, a press molding method, a centrifugal method drawing a resin by centrifugal method, and an extrusion molding method extruding a resin from an extruder in the form of sheet can be given.

In the pre-curing step, after the resin layer forming molding step, the resin layer 4 is heated for a predetermined period of time and kept at a predetermined temperature to temporarily cured a resin raw material. In the embodiment, the temperature in the pre-curing step is set at 80° C.

In the main curing step, a resin raw material is cured by performing heat treatment to the resin layer 4. The main curing step, in the embodiment, is performed by heating the resin raw material at 150° C. for 2 hours in a heating furnace.

In the recesses and projections forming step, the recesses and projections 6 having a predetermined shape is formed on the resin layer 4 formed in the resin layer forming step. The recesses and projections forming step is performed by irradiating a laser beam as shown in FIG. 1.

In the embodiment, the coating layer forming step to form another coating layer may be performed. The coating layer forming step is a step of forming a predetermined surface coating layer 8 on the recesses and projections 6 (see FIG. 14 to FIG. 17). The coating layer forming step is performed, more specifically, such that a predetermined coating agent is sprayed on the surface of the recesses and projections 6 by a spraying process, and, thereafter, the recesses and projections 6 is held at 150° C. for 2 hours in a heating furnace to cure the matte layer 82 serving as a coating agent, the mirror surface coating layer 84, or the gloss adjusting layer 86.

Subsequently, steps of forming the resin layer 4 having the recesses and projections 6 according to FIG. 10 to FIG. 19 to complete the resin molding mold 1 will be described with reference to the flow chart in FIG. 20. The steps include step ST11 to step ST17. A main body of these steps is an operator who performs processes to the mold main body 2 in the steps.

Step ST11

In step ST11, the operator forms the resin layer 4 by spraying or the like on the mold surface 22 side of the mold main body 2. More specifically, the operator performs the resin layer forming step. The process shifts to step ST12. More specifically, on the mold surface 22 of the resin molding mold, by using a spray gun, a resin (configuring the first layer 42, the second layer 44, the third layer 46, or the mirror surface coating material layer 48) is sprayed.

Step ST12

In step ST12, the operator temporarily cures the resin layer 4 formed on the mold surface 22 side of the mold main body 2. More specifically, the operator performs the pre-curing step. The process shifts to step ST13. More specifically, in step ST12, the sprayed resin is temporarily cured.

In step ST13, the operator determines whether the resin layer 4 is further formed. When the operator determines that the resin layer 4 is further formed (Yes in step ST13), the process shifts to step ST11. When the operator determines that the resin layer 4 is not further formed (No in step ST13), the process shifts to step ST14. More specifically, when the resin molding mold 1 including the plurality of resin layers 4 is manufactured, the resin layer forming step and the pre-curing step are performed to each of the plurality of resin layers 4. That is, when the resin molding mold 1 to be formed is not of the single-layer type 1*a*, the resin layer forming step and the pre-curing step are repeated to form the desired resin layer 4.

Step ST14

In step ST14, the operator fully cures the resin layers 4 formed as a single layer or a plurality of layers. More specifically, the operator the main curing step described above. At this stage, the mold raw material 10 is completed. The mold raw material 10, as described above, can also directly used as the resin molding mold 1. The process shifts to step ST15. Thereafter, a step of polishing and adjusting the laser-processed surface of the resin layer 4 and uniforming a resin thickness from the mold surface 22 (removing surface waviness) may be set.

Step ST15

In step ST15, the operator operates the laser processing machine LP shown in FIG. 1 to form the recesses and projections 6 on the resin layer 4 formed in the mold raw material 10. More specifically, the recesses and projections forming step is performed. The process shifts to step ST16. In this case, in the embodiment, on the basis of data based on the uneven sample M and data stored in advance, processing data which is processed by predetermined software is created.

Step ST16

In step ST16, the operator determines whether a coating layer is further formed on the resin layer 4 on which the recesses and projections 6 is formed. When the operator determines that the coating layer is further formed (Yes in step ST16), the process shifts to step ST17. When the operator determines that the coating layer is not formed (No in step ST17), the process ends.

Step ST17

In step ST17, the operator further forms a coating layer on the surface of the formed recesses and projections 6. More specifically, the operator performs the coating layer forming step. The process ends. That is, in step ST17, as needed, the surface coating layer 8 (the matte layer 82, the mirror surface coating layer 84, or the gloss adjusting layer 86) serving as an additional layer is formed by the spraying process.

Modification

A modification of the embodiment will be described below. In the modification, the same reference symbols are added to the same constituent elements as in the embodiment, and the same constituent elements will not be described in detail.

Figure 21:
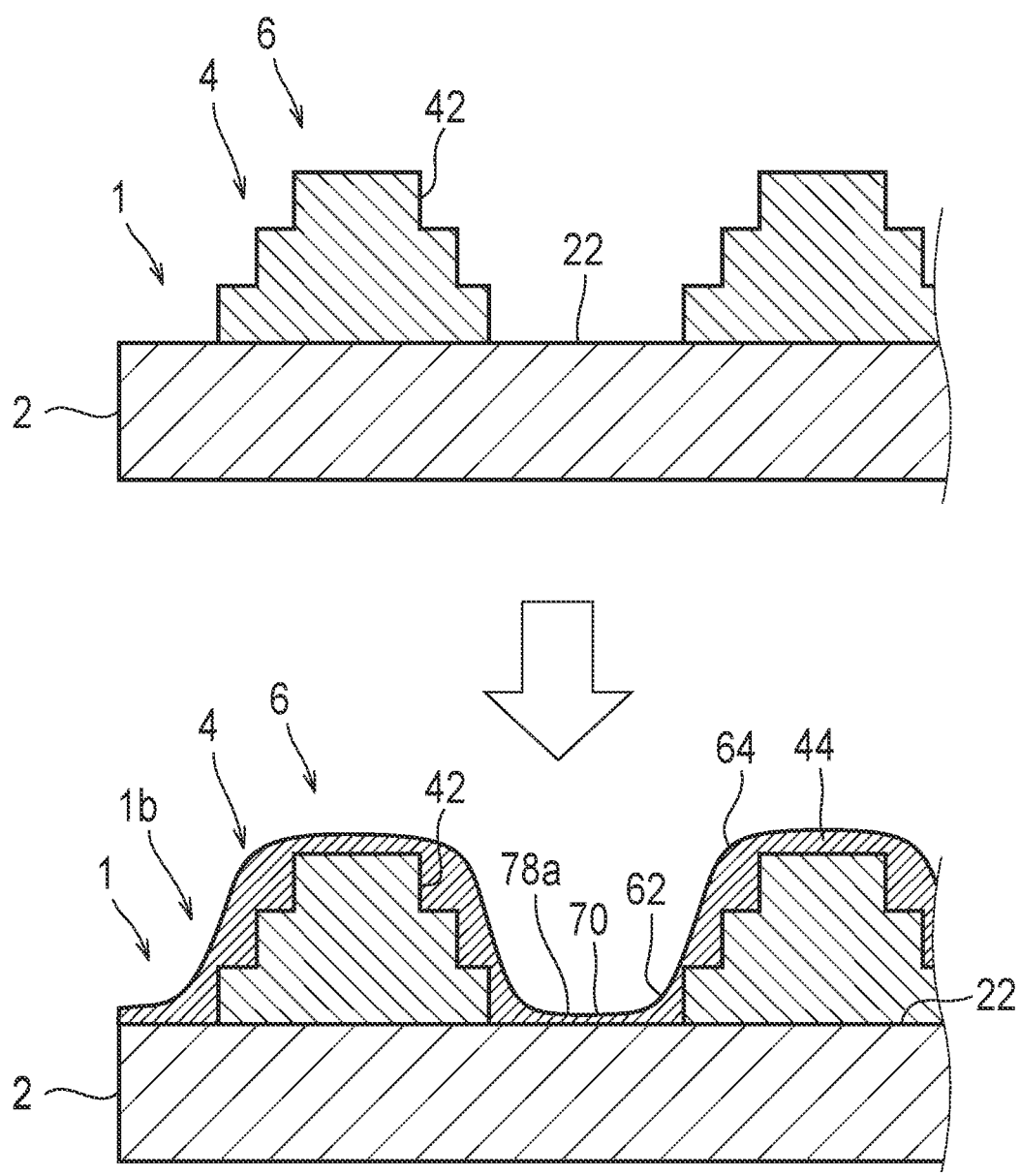
FIG. 21 is an end view for explaining a resin layer of a resin molding mold according to a modification of the embodiment of the present invention.

According to the modification, as shown in FIG. 21, the recesses and projections 6 having a shape different from that in the embodiment can be formed on the resin layer 4.

More specifically, the resin layer 4, as shown in the upper part of FIG. 21, is the resin molding mold 1 of the single-layer type 1*a* in which the recesses and projections 6 is formed on the first layer 42.

The resin molding mold 1 according to the modification, as shown in the lower part of FIG. 21, the second layer 44 (or may be the mirror surface coating material layer 48) is further formed on the resin molding mold 1 in which the recesses and projections 6 shown in the upper part of FIG. 21 is formed by a laser beam to form the recesses and projections 6 which is entirely different from the recesses and projections 6 shown in FIG. 10 to FIG. 19.

More specifically, the recesses and projections 6 shown in the lower part of FIG. 21 has a rolling which is gentle more than those of the recesses and projections 6 shown in FIG. 10 to FIG. 19. When the recesses and projections 6 shown in the lower part of FIG. 21 is formed by the surface shape of the uneven (the recesses and projections) sample M (see FIG. 1), the resin molded product A having a surface shape being more faithful to the uneven sample M may be able to be obtained.

Figure 22:
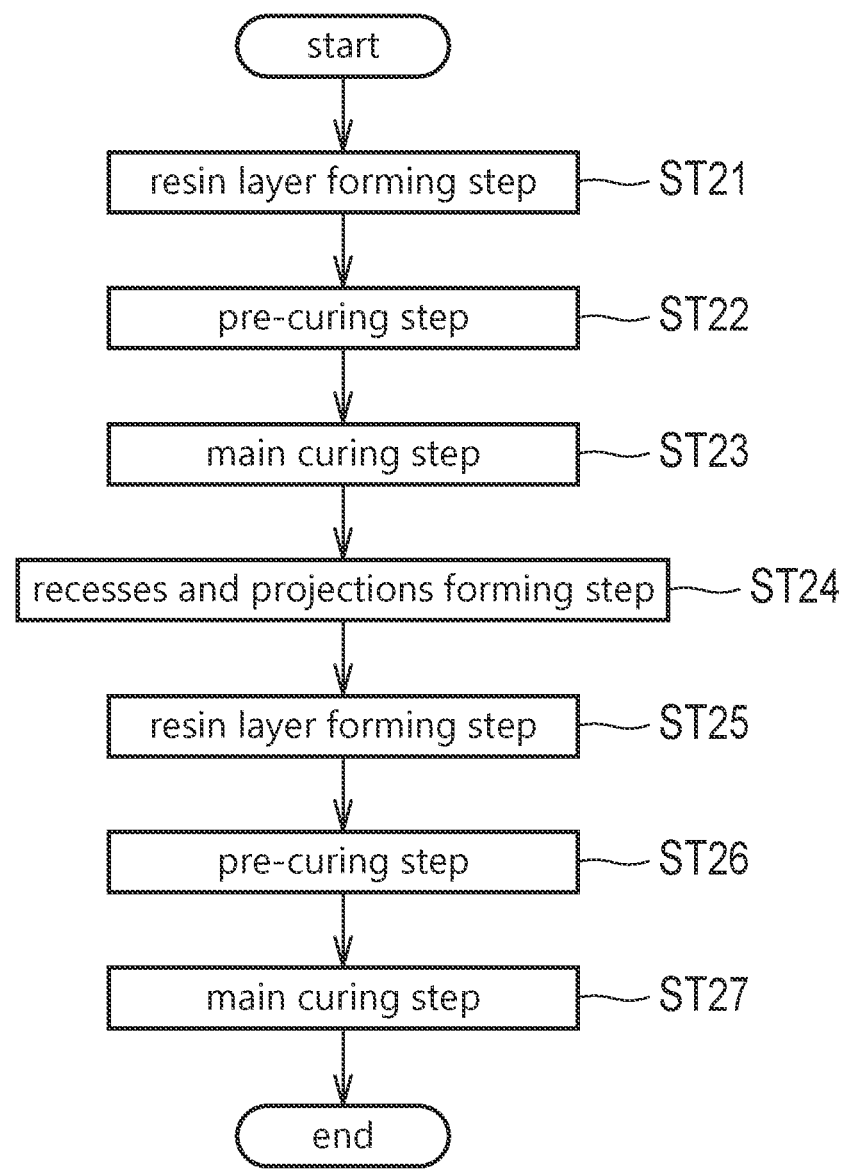
FIG. 22 is a flow chart for explaining a method of manufacturing a resin molding mold according to a modification of the embodiment of the present invention.

Subsequently, the steps to form the recesses and projections 6 shown in FIG. 21 will be described with reference to the flow chart in FIG. 22. The steps include step ST21 to step ST27. A main body of these steps, as in the above embodiment, is an operator which performs processes in the steps to the mold main body 2.

Step ST21

In step ST21, the operator forms the resin layer 4 by performing spraying or the like on the mold surface 22 side of the mold main body 2 is performed. The process shifts to step ST22.

Step ST22

In step ST22, the operator temporarily cures the resin layer 4 formed on the mold surface 22 side of the mold main body 2. More specifically, the operator performs the pre-curing step. The process shifts to step ST23.

Step ST23

In step ST23, the operator fully cures the resin layer 4 formed as a single layer. More specifically, the operator performs the main curing step. At this stage, the mold raw material 10 is completed. The mold raw material 10, as described above, can also be directly used as the resin molding mold 1. The process shifts to step ST24.

Step ST24

In step ST24, the operator operates the laser processing machine LP shown in FIG. 1 to form the recesses and projections 6 on the resin layer 4 formed on the mold raw material 10. More specifically, the recesses and projections forming step is performed. The process shifts to step ST25.

Step ST25

In step ST25, the operator forms the resin layer 4 on the mold surface 22 side of the mold main body 2 by spraying or the like. The resin layer forming step is performed. The process shifts to step ST26.

Step ST26

In step ST26, the operator temporarily cures the resin layer 4 formed on the mold surface 22 side of the mold main body 2. More specifically, the operator performs the pre-curing step. The process shifts to step ST27.

Step ST27

In step ST27, the operator fully cures the resin layer 4 formed as a single layer or a plurality of layers. More specifically, the operator the main curing step. At this stage, the mold raw material 10 is completed. The mold raw material 10, as described above, can be directly used as the resin molding mold 1. The process ends. As a matter of course, after step ST27, the coating layer 8 is further formed.

In this manner, according to the modification, as in the embodiment, the resin molding mold 1 which can obtain the resin molded product A on which the desired recesses and projections 6 is formed can be provided.

Method of Manufacturing Resin Molded Product A

According to the resin molding molds 1 provided by the embodiment and the modification thereof, the resin molded product A having a desired surface shape can be obtained.

More specifically, the method of manufacturing the resin molded product A according to the embodiment has the resin filling step, a mold resin curing step, and the removing step.

The resin filling step is a step of filling a molding resin in a fluid state into the resin molding mold 1 according to the embodiment or the modification. More specifically, in the filling of the molding resin, various existing methods can be applied like methods used in injection molding and blow molding. In the embodiment, a synthetic resin cured at a low temperature of 200° C. or less.

The molding resin curing step is a step of curing the molding resin after the resin filling step. More specifically, various existing methods such as curing of a resin by a decrease in temperature and curing of a resin by UV irradiation can be applied.

The removing step is a step of removing the cured molding resin from the resin molding mold 1. In the removing step, thereafter, the step of performing appropriate processing to the resin molded product A removed from the resin-molded mold 1 to obtain a final product a user requires is not denied.

Figure 23:
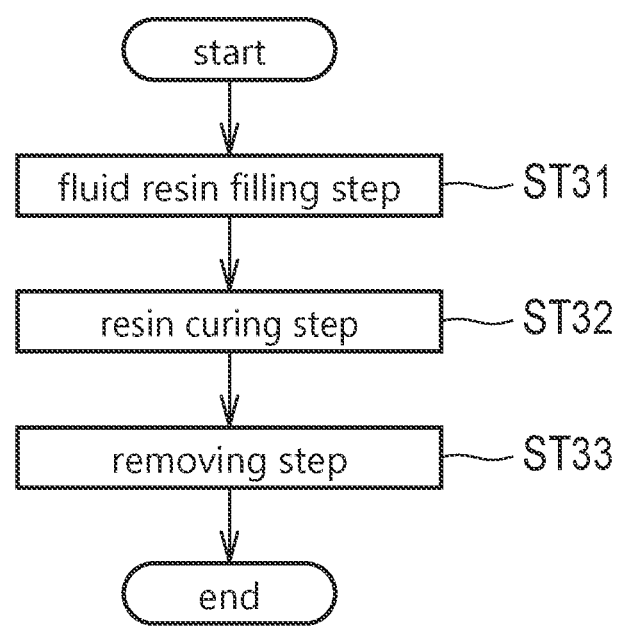
FIG. 23 is a flow chart showing a method of manufacturing a resin molded product according to the embodiment of the present invention.

Subsequently, the steps related to the method of manufacturing the resin molded product A according to the embodiment will be described with reference to the flow chart shown in FIG. 23. A main body of the steps is a user who obtains the resin molding molds 1 according to the embodiment and the modification by purchasing or the like to use the resin molding mold 1. The steps include step ST31 to step ST33.

Step ST31

In step ST31, the user fills a liquid molding resin into the resin molding mold 1. More specifically, the user performs the resin filling step. The process shifts to step ST32.

Step ST32

In step ST32, the user cures the molding resin filled in the resin molding mold 1. More specifically, the user performs the resin curing step. The process shifts to step ST33.

Step ST33

In step ST33, the user removes the molding resin filled in the resin molding mold 1 to obtain the resin molded product A according to the embodiment. More specifically, the user performs the removing step. The process ends.

As described above, according to the method of manufacturing the resin molded product A according to the embodiment, the resin molded product A having high quality can be provided while performing manufacturing in the same steps as in conventional mold molding. More specifically, defective appearance of the resin molded product A manufactured by the resin molding mold 1 according to the embodiment is reduced. In addition, the resin molded product A manufactured by the resin molding mold 1 according to the embodiment is a high-design resin molded product having the pattern of the recesses and projections 6 which cannot be easily manually obtained. Furthermore, whitening which is occasionally found on the conventional resin molded product, caused by fine galling, and called "white blur" is reduced. In the resin molded product A according to the embodiment, unnecessary ups and downs called a swirl mark caused by gas generated in molding are reduced.

With the configuration described above, in the resin molding mold 1 according to the embodiment, the ceramic powder particle 4b exposed to the mold surface 22 side effectively adsorbs gas generated in resin molding. In this manner, nonuniformity of quality of the resin product can be effectively suppressed. Since the thickness of the resin layer 4 is set to 50 to 800 µm, surface processing is additionally performed to a desired position of the resin layer 4 to make it possible to give a desired surface shape to the resin molded product A. As a result, the resin molding mold 1 which can manufacture the resin molded product A having the desired surface shape can be provided. According to the embodiment, the heat-blocking effect obtained by the resin layer 4 improves the fluidity of the molding resin to obtain an advantage which makes the occurrence of defective molding less. Furthermore, the fine unevenness obtained by ceramic powder contained in the resin layer 4 serves as an escapeway for gas generated in molding. In addition, since the ceramic powder itself serving as a porous material contained in the resin layer 4 absorbs gas generated in molding, defective molding caused by gas does not easily occur. In addition, when a multi-layered structure is made of a resin different from that of the resin layer 4, a skin layer formation suppressing effect of the molding resin can be obtained, and the resin molded product A having less defective appearance and a high reversal rate of the uneven pattern can be obtained.

In particular, when an recesses and projections is formed on a metal mold to form an recesses and projections on the surface of a conventional resin molded product, an etching process is performed by a photoetching method. In the etching process, a pattern mask made of a polyester film or the like is cut in, in tight contact with the mold along the mold shape, and exposed to form an acid-proof pattern. For this reason, a seam or an unnatural line may be formed. However, according to the resin-molded mold 1 according to the embodiment, the resin molded product A which forms a high-quality surface shape without a seam and an unnatural line can be provided. In other words, data in the personal computer PC is brought in while using the uneven sample M as a motif, and the motif and the data are seamlessly processed by software stored in the personal computer so as to achieve the shape of the high-design recesses and projections 6.

In the resin molding mold 1 according to the embodiment, since the resin layer 4 is partially dug to form the recesses and projections 6, the resin-molded mold 1 to which a unique texture such as embossing is given is provided. As a result, the resin molding mold 1 which can stably manufacture a resin product having a desired surface shape is provided.

In particular, in the embodiment, in order to achieve a change of the recesses and projections 6 by replacing the resin layers 4 without switching the mold main bodies 2, the recesses and projections 6 is formed on only the resin layer 4. More specifically, since a mold itself is not processed unlike an etching process, reprocessing can be easily performed (as long as the resin layer 4 is peeled and reformed). In addition, a pattern formed by the recesses and projections 6 can be formed on an unintended recesses and projections 6 formed by corrosion or a molding mold made of a material increasing in surface roughness by a hollow. Furthermore, a pattern formed by the recesses and projections 6 can be formed on a mode made of a sintered material (porous material) on which the pattern of the recesses and projections 6 is difficult to be formed by an etching process, a mold a metal powder lamination molding method, and the mold main body 2 serving as a mold obtained by a 3D printer.

In addition, in order to achieve a variety of surface shapes, in the embodiment, the recess portion forming the recesses and projections 6 has the recess portion of the mold surface 22 in which the bottom surface 70 is obtained by exposing the mold surface 22 of the mold main body 2 and a resin recess portion having the bottom surface 70 in the resin layer 4.

The resin layer 4 has a plurality of layers having different ratios of the synthetic resin 4a and the ceramic powder particle 4b, and end faces of the plurality of layers are exposed at a position where the recesses and projections 6 is formed, so that the characteristics of the layers are made different from each other. In this manner, problems such as generation of gas occurring in molding of the resin molded product A and a defective flow of a molding resin which are posed in conventional resin molding are solved to achieve molding of the resin molded product A having higher quality.

In order to further exert the characteristics of the layers, in the embodiment, recess portions forming the recesses and projections 6 are formed on the plurality of layers having the different bottom surfaces 70 by making digging depths different from each other.

In order to secure desired strength for the plurality of resin layers 4, according to the embodiment, any one of the resin layers 4 further includes the inorganic fibers 4d, and the inorganic fibers 4d have fiber lengths of 5 tom 200 μm and fiber diameters of 0.05 to 1.5 μm.

Furthermore, as a concrete configuration to give different characteristics to the plurality of resin layers 4, respectively, in the embodiment, when the plurality of resin layers 4 are laminated from the mold surface 22 of the mold main body 2, the ratio of the inorganic fibers 4d progressively decreases.

In particular, in the embodiment, since the plurality of resin layers 4 are configured to improve the quality of the resin molded product A, the ratio of the inorganic fibers 4d decreases when the plurality of resin layers 4 are laminated from the mold surface 22 of the mold main body 2. The mirror surface coating material layer 48 which does not include the inorganic fibers 4d is applied to the resin layer 4 farthest from the mold surface 22 (see FIG. 9 and FIG. 13).

In order to configure the surface of a resin product having a desired shape and a desired texture, the surface costing layer 8 is formed on the surface of the resin layer 4 (see FIG. 14 to FIG. 17).

As a concrete example of the coating layer, the matte layer 82, the mirror surface coating layer 84, or the gloss adjusting layer 86 is given.

In order to absorb gas generated in molding, in the embodiment, the resin layer 4 contains 45 to 65% ceramic powder particle 4b.

In addition, since the grain diameter of the ceramic powder particle 4b is set to 0.1 to 70 μm, absorption of gas generated in molding or texture of a degree of matte of the surface of a molded product become preferable.

In this case, according to the method of manufacturing the resin molding mold 1 according to the present invention, the resin molding mold 1 having a surface to which unique texture such as embossing is given is provided. As a result, the resin molding mold 1 which can stably manufacture a resin product having a desired surface shape can be provided.

Although the diluent solvent 4c used in the resin layer 4 evaporates in manufacturing, ethyl cellosolve monoacetate which is generally known to have a volatilization rate lower than that of another ordinary solvent is used to achieve high workability in manufacturing of the resin molding mold 1.

In order to achieve the surface shape of the more accurate resin molded product A or reliably achieve the texture of a preferable surface of the resin molded product A, according to the embodiment, the recesses and projections forming step is performed by irradiating a laser beam. More specifically, by using the laser processing machine LP, formation of a pattern (embossing pattern) of the recesses and projections 6 is achieved at a pattern depth of the any recesses and projections 6 suitable for a draft angle is easily achieved. More specifically, by using the laser processing machine LP, the pattern (embossing pattern) of the recesses and projections 6 is formed at a pattern depth of the any recesses and projections 6 suitable for a draft angle of a mold is easily formed.

As the laser beam, a laser beam emitted by any one of a carbon dioxide gas laser processing machine LP, a fiber laser processing machine LP, a femtosecond laser processing machine LP, a blue laser processing machine LP, a green laser processing machine LP, and a multi-wavelength composite laser processing machine LP which can coaxially irradiate at least two wavelengths emitted from laser oscillators is used, the resin molding mold 1 which can manufacture the resin molded product A having a desired surface shape is achieved.

In order to preferably manufacture the resin molding mold 1 having the resin layer 4 including the plurality of resin layers 4, in the embodiment, the resin layer forming step and the pre-curing step are performed to each of the plurality of resin layers 4.

In order to stably manufacture the resin-molded mold 1 which can manufacture a molded product having a desired surface shape for a demander, in the embodiment, the recesses and projections 6 formed in the recesses and projections forming step is based on data obtained by scanning the uneven sample M (see FIG. 1) with a scanner.

The resin molding mold manufacturing system S according to the embodiment is the resin molding mold manufacturing system S to manufacture the resin molding mold 1 by giving the recesses and projections 6 to the mold surface 22 of the mold raw material 10 to manufacture the resin molded product A includes the mold raw material 10, a scanner, and the laser processing machine LP and includes the scanning step of scanning the surface shape of the uneven sample M (see FIG. 1) with a scanner and the laser processing step of processing the surface of the mold raw material 10.

In this manner, data related to the uneven sample M (see FIG. 1) and obtained by the scanner is appropriately processed to achieve the pattern of the recesses and projections 6 having an any depth suitable for the shape without an unnatural line and a seam. In addition, since the pattern is arranged in accordance with the mold shape on the data, the surface shape which is free from an unnatural line and a seam is configured. More specifically, design restriction of the resin molded product A which can be manufactured by the resin-molded mold 1 is less than that of a conventional resin molded product.

The method of manufacturing a resin molded product according to the present invention has the resin filling step, the resin curing step, and the removing step to make it possible to provide the high-quality resin molded product A by using any one of the resin molding molds 1 described above. In this case, the "high-quality" is a molded product having reduced defective appearance and the high-design (having an uneven pattern which is not easily manually formed) resin molded product A.

As described above, the embodiment of the present invention is disclosed in the above description. However, the present invention is not limited to the embodiment.

More specifically, mechanisms, shapes, materials, quantities, positions, arrangements, or the like in the embodiment described above can be variously changed without departing from the technical idea and the scope of object of the present invention, and the changes are included in the present invention.

EXAMPLES

Examples of the present invention will be described below. The examples do not limit the scope of rights of the present invention.

Example 1

In Example 1, manufacturing procedures of a resin molding mold corresponding to the flow chart shown in FIG. 20 according to the embodiment will be further concretely explained.

(1) Degreasing and Washing of Mold
Degreasing and washing for a mold surface is performed with an organic solvent such as tetrachloroethylene, methanol, or thinner.

(2) Masking of Part where Resin Layer is Not Formed
A part where a resin layer is not formed is masked with a predetermined masking material, a gummed tape, or the like.

(3) Formation of First Resin Layer
An epoxy resin (80 parts by weight of a synthetic resin, 50 parts by weight of ceramic powder, 10 parts by weight of inorganic fiber, and 50 parts by weight of diluent solvent) is sprayed by using a spray gun, and dried and temporarily cured until the diluent solvent is evaporated. This procedure corresponds to steps ST11 and ST12 in FIG. 20.

(4) Formation of Second Resin Layer
An epoxy resin (80 parts by weight of a synthetic resin, 50 parts by weight of ceramic powder, 5 parts by weight of inorganic fiber, and 50 parts by weight of diluent solvent) is sprayed by using a spray gun, and dried and temporarily cured until the diluent solvent is evaporated. This procedure corresponds to steps ST11 and ST12 in FIG. 20.

(5) Formation of Third Resin Layer
An epoxy resin (80 parts by weight of a synthetic resin, 50 parts by weight of ceramic powder, 1 part by weight of inorganic fiber, and 50 parts by weight of diluent solvent) is sprayed by using a spray gun, and dried and temporarily cured until the diluent solvent is evaporated. This procedure corresponds to steps ST11 and ST12 in FIG. 20.

(6) Curing
After all the resin layers are formed, and the resin layers are fully cured in a heating furnace (kept at 150° C. for 2 hours). This procedure corresponds to step ST14 in FIG. 20.

(7) Surface Adjustment
The surface to be irradiated with a laser of the formed resin layers is polished, adjusted to make a resin thickness from the mold surface uniform (remove surface waviness).

(8) Laser Processing
Uneven pattern processing data created in advance is mapped (positioning and confirmation of pattern) in accordance with a mold shape, and an uneven pattern is formed by a laser processing machine. This procedure corresponds to step ST15 in FIG. 20.

(9) Masking of Part where Additional Layer is Not Formed
A part where the additional layer is not formed is masked with a predetermined masking material, a gummed tape, or the like.

(10) Formation of Additional Layer
An additional layer (70 parts by weight of synthetic resin, 15 parts by weight of matte agent, and 15 parts by weight of diluent solvent) is formed by a spraying process and cured in a heating furnace (kept at 150° C. for 2 hours). This procedure corresponds to step ST17 in FIG. 20.

Example 2

As Example 2, by using the resin molding mold manufacturing system S (see FIG. 1) described above, a series of steps used until the resin-molded mold 1 according to the embodiment is manufactured will be described below.

A mold raw material 10 is prepared, and the shape of the mold raw material 10 is scanned with a three-dimensional scanner SC serving as a scanner. Scanned data is stored in the personal computer PC connected to the three-dimensional scanner SC. The step is the mold raw material scanning step.

Subsequently, an uneven sample M is prepared, at least a surface shape of the uneven sample M is scanned with the three-dimensional scanner SC serving as a scanner. The scanned data is stored in the personal computer PC connected to the three-dimensional scanner SC.

The step corresponds to the scanning step of scanning the surface shape of the uneven sample M with the three-dimensional scanner SC.

In the embodiment, data related to the mold raw material 10 and one or a plurality of uneven samples M and stored in the personal computer PC and storage data stored in the computer PC in advance and related to the surface shape are combined to each other. In an example which will be explained, the personal computer PC sets a position where the data related to the uneven sample M is reflected on the parts of the mold raw material 10 (see FIG. 1 and FIGS. 6 to 9) and sets a surface shape related to the storage data to a position except for the position.

In the embodiment, in the personal computer PC, a specific program which can forms a continuous shape obtained by connecting the surface shape related to the data related to the uneven sample M to the surface shape related to the storage data as if there is no seam is stored (see FIG. 3). By using the data related to the uneven sample M, the sample data, and the program, a concrete shape of the recesses and projections 6 to be given to the mold raw material is set.

The step is the uneven data editing step which can be performed next to the scanning step.

Subsequently, the laser processing machine LP is controlled depending on data scanned and edited in the scanning step and the uneven data editing step, and the surface of the mold raw material 10 is processed. As a concrete example, in the embodiment, as the laser processing machine LP to process the uneven data, the femtosecond laser processing machine having an output of 20 W is applied. The depth of the recesses and projections 6, i.e., the shape of the recesses and projections 6 concretely formed in the mold raw material 10 can be adjusted by appropriately changing settings such as the output and the frequency of the femtosecond laser processing machine.

The step corresponds to the laser processing step of controlling the laser processing machine depending on the data scanned in the scanning step to process the surface of the mold raw material.

In this manner, the resin molding mold manufacturing system S according to the embodiment, the personal computer PC is utilized while using one or a plurality of uneven samples M and existing data to make it possible to form a desired recesses and projections 6 on the mold raw material 10.

INDUSTRIAL APPLICABILITY

The invention relates to a resin molding mold and can be used in a resin molding mold to perform resin molding used when a resin molded product having, on the surface, an embossed pattern (leather texture, skin texture, wood texture, pear skin texture, vein texture, scale texture, marble texture, mirror finish, finish coating, geometric patterns, and the like) conditioning the molding surface for improving, in particular, product design, a method for the same, and a resin molded product molded by the resin molding mold.

REFERENCE NUMERALS 1 resin molding mold
1a resin molding mold of single-layer type
1b resin molding mold of two-layer type
1c1 resin molding mold of three-layer type (1)
1c2 resin molding mold of three-layer type (2)
2 mold main body
22 mold surface
4 resin layer
4a synthetic resin 4a
4b ceramic powder particle
4c inorganic fiber
42 first layer
44 second layer
46 third layer
48 mirror surface coating material layer
6 recesses and projections
62 tapered recess portion
64 tapered projection portion
66 straight recess portion
68 straight projection portion
70 bottom surface
72 radial portion
74 bent portion
76 cutout end face
78a mold bottom surface
78b resin bottom surface
78 surface coating layer
82 matte layer
84 mirror surface coating layer
86 gloss adjusting layer
A resin molded product
S resin molding mold manufacturing system
SC three-dimensional scanner
PC personal computer
LP laser processing machine
M uneven (the recesses and projections) sample
ST11 step (resin layer forming step)
ST12 step (pre-curing step)
ST13 step (confirmation of addition of resin layer)
ST14 step (main curing step)
ST15 step (recesses and projections forming step)
ST16 step (coating layer formation confirmation)
ST17 step (coating layer forming step)
ST21 step (resin layer forming step)
ST22 step (pre-curing step)
ST23 step (main curing step)
ST24 step (recesses and projections forming step)
ST25 step (resin layer forming step)
ST26 step (pre-curing step)
ST27 step (main curing step)
ST31 step (fluid resin filling step)
ST32 step (resin curing step)
ST33 step (removing step)

The invention claimed is:
1. A resin molding mold, comprising:
a molding mold main body; and
a resin layer being formed and exposed on a mold surface side of the molding mold main body, the resin layer comprising heat-resistant composite materials including a synthetic resin and a ceramic powder particle, wherein
recesses and projections are formed on the resin layer by excavating a portion of the resin layer, and
the resin layer includes a plurality of layers, each of which has a different content of the synthetic resin and the ceramic powder particle, an end surface of each of the plurality of layers of the resin layer being exposed where the recesses and projections are formed.

2. The resin molding mold according to claim 1, wherein the recesses and projections are formed on the resin layer only.

3. The resin molding mold according to claim 2, wherein the recesses of the recesses and projections includes a mold bottom surface and a resin bottom surface,
the mold bottom surface being obtained by exposing a mold surface of the mold main body, and
the resin bottom surface being formed on the resin layer.

4. The resin molding mold according to claim 3, further comprising an inorganic fiber in at least one of the plurality of layers in the resin layer, wherein
the inorganic fiber has a fiber length of 0.05 μm to 200 μm and a fiber diameter of 0.05 μm to 80 μm.

5. The resin molding mold according to claim 3, further comprising an inorganic fiber in each of the plurality of layers in the resin layer, wherein
between any two of the plurality of layers, the one that is farther from the molding mold main body has a smaller amount of the inorganic fiber.

6. The resin molding mold according to claim 3, further comprising an inorganic fiber in each of the plurality of layers, except for one thereof farthest from the molding mold main body, in the resin layer, wherein
between any two of the plurality of layers, the one that is farther from the molding mold main body has a smaller amount of the inorganic fiber.

7. The resin molding mold according to claim 1, wherein in the recesses of the recesses and projections, each resin layer has a bottom surface of the recesses due to a different depth of excavation.

8. The resin molding mold according to claim 1, further comprising a coating layer provided on a surface of the resin layer.

9. The resin molding mold according to claim 8, wherein the coating layer is a matte layer, a mirror surface layer, or a gloss adjustment layer.

10. The resin molding mold according to claim 1, wherein the ceramic powder particle has a diameter of 0.1 μm to 70 μm.

11. A method for manufacturing a resin molding mold, the method comprising;

a resin layer forming step of forming, on a mold surface of a mold main body, a resin layer comprising heat-resistant composite materials including a synthetic resin, a ceramic powder particles and a diluent solvent;

a temporarily curing step of temporarily curing resin materials by heating for a given time and maintaining a fixed temperature after the resin layer forming step;

a main curing step of curing the resin materials by a heat treatment of the resin materials; and a recesses and projections forming step of forming recesses and projections of a prescribed shape on the resin layer formed in the resin layer forming step, by excavating a portion of the resin layer, wherein the resin layer includes a plurality of layers, each of which has a different content of the synthetic resin and the ceramic powder particle, an end surface of each of the plurality of layers of the resin layer being exposed where the recesses and projections are formed.

12. The method for manufacturing the resin molding mold according to claim 11, wherein the diluent solvent is ethyl cellosolve monoacetate.

13. The method for manufacturing the resin molding mold according to claim 11, wherein the recesses and projections forming step is conducted by using laser light irradiation.

14. The method for manufacturing the resin molding mold according to claim 13, wherein
the laser light is radiated by any of a carbon dioxide gas laser processing machine, a fiber laser processing machine, a femtosecond laser processing machine, a blue laser processing machine, a green laser processing machine, and multi-wavelength composite laser processing machine which coaxially radiates two types or more wavelengths generated by laser oscillation source.

15. The method for manufacturing the resin molding mold according to claim 11, wherein
the recesses and projections formed in the recesses and projections forming step are based on data scanned a recesses and projections sample with a scanner beforehand.

* * * * *